United States Patent
Martin et al.

(10) Patent No.: US 12,525,040 B2
(45) Date of Patent: Jan. 13, 2026

(54) MACHINE LEARNING MODELS FOR CELL LOCALIZATION AND CLASSIFICATION LEARNED USING REPEL CODING

(71) Applicant: Ventana Medical Systems, Inc., Tucson, AZ (US)

(72) Inventors: Jim F. Martin, Mountain View, CA (US); Satarupa Mukherjee, Fremont, CA (US); Yao Nie, Sunnyvale, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 370 days.

(21) Appl. No.: 18/167,455

(22) Filed: Feb. 10, 2023

(65) Prior Publication Data

US 2023/0186659 A1 Jun. 15, 2023

Related U.S. Application Data

(63) Continuation of application No. PCT/US2021/045728, filed on Aug. 12, 2021.
(Continued)

(51) Int. Cl.
*G06V 10/774* (2022.01)
*G06N 3/0455* (2023.01)
(Continued)

(52) U.S. Cl.
CPC ......... *G06V 20/698* (2022.01); *G06N 3/0455* (2023.01); *G06N 3/0464* (2023.01);
(Continued)

(58) Field of Classification Search
None
See application file for complete search history.

(56) References Cited

U.S. PATENT DOCUMENTS

2003/0081833 A1* 5/2003 Tilton ............... G06V 10/267
382/173
2016/0358337 A1* 12/2016 Dai .......................... G06T 7/11
(Continued)

FOREIGN PATENT DOCUMENTS

JP 2019533866 A 11/2019
WO 2020066233 A1 4/2020

OTHER PUBLICATIONS

Colomer et al., "Multi-Organ Nuclei Segmentation through Fully Convolutional Neural Networks and Marker-Controlled Watershed", Available Online at: https://www.researchgate.net/publication/340998438_Rank_26_Multi-organ_Nuclei_Segmentation_Through_Fully_Convolutional_Neural_Networks_and_Marker-controlled_Watershed_1_Pre-Processing, Dec. 29, 2018, 4 pages.
(Continued)

*Primary Examiner* — Tsung Yin Tsai
(74) *Attorney, Agent, or Firm* — Kilpatrick Townsend & Stockton LLP

(57) ABSTRACT

The present disclosure relates to computer-implement techniques for cell localization and classification. Particularly, aspects of the present disclosure are directed to accessing an image for a biological sample, where the image depicts cells comprising a staining pattern of a biomarker; inputting the image into a machine learning model; encoding, by the machine learning model, the image into a feature representation comprising extracted discriminative features; combining, by the machine learning model, feature and spatial information of the cells and the staining pattern of the biomarker through a sequence of up-convolutions and concatenations with the extracted discriminative features from the feature representation; and generating, by the machine learning model, two or more segmentation masks for the biomarker in the image based on the combined feature and
(Continued)

spatial information of the cells and the staining pattern of the biomarker.

14 Claims, 12 Drawing Sheets

Related U.S. Application Data

(60) Provisional application No. 63/065,268, filed on Aug. 13, 2020.

(51) Int. Cl.

| | | |
|---|---|---|
| *G06N 3/0464* | (2023.01) | |
| *G06T 7/00* | (2017.01) | |
| *G06T 7/11* | (2017.01) | |
| *G06V 10/82* | (2022.01) | |
| *G06V 20/69* | (2022.01) | |

(52) U.S. Cl.
CPC .............. *G06T 7/0012* (2013.01); *G06T 7/11* (2017.01); *G06V 10/774* (2022.01); *G06V 10/82* (2022.01); *G06V 20/695* (2022.01); *G06T 2207/10056* (2013.01); *G06T 2207/10064* (2013.01); *G06T 2207/20021* (2013.01); *G06T 2207/20081* (2013.01); *G06T 2207/20084* (2013.01); *G06T 2207/30096* (2013.01); *G06T 2207/30204* (2013.01); *G06V 2201/03* (2022.01)

(56) References Cited

U.S. PATENT DOCUMENTS

| | | |
|---|---|---|
| 2019/0206056 A1 | 7/2019 | Georgescu et al. |
| 2019/0392580 A1 | 12/2019 | Kapil et al. |
| 2020/0097701 A1 | 3/2020 | Chukka et al. |
| 2020/0211189 A1 | 7/2020 | Yip et al. |

OTHER PUBLICATIONS

Gu et al., "CE-NET: Context Encoder Network for 2D Medical Image Segmentation", Arxiv.org, Cornell University Library, Mar. 7, 2019, 12 pages.

Liang et al., "Enhanced Center Coding for Cell Detection with Convolutional Neural Networks", Available online at: https://arxiv.org/pdf/1904.08864.pdf, Apr. 18, 2019, 9 pages.

PCT/US2021/045728 , "International Search Report and Written Opinion", Nov. 22, 2021, 15 pages.

Chamanzar et al., "Weakly Supervised Multi-Task Learning for Cell Detection and Segmentation", 2020 Institute of Electrical and Electronics Engineers 17thInternational Symposium on Biomedical Imaging (ISBI), USA, Institute of Electrical and Electronics Engineers, Apr. 3, 2020, pp. 513-516.

JP Application No. 2023-509709, "Office Action", Jan. 19, 2024, 9 pages.

Sommer et al., "Machine learning in cell biology—teaching computers to recognize phenotypes", Journal of Cell Science, England, vol. 126, No. 24, Dec. 15, 2013, pp. 5529-5539.

JP Application No. 2023-509709 , "Office Action", Apr. 26, 2024, 8 pages.

EP Application No. 21766284.0, "Intention to Grant", Jul. 16, 2025, 7 pages.

JP Application No. 2024-137511, "Office Action", Jun. 4, 2025, 14 pages.

\* cited by examiner

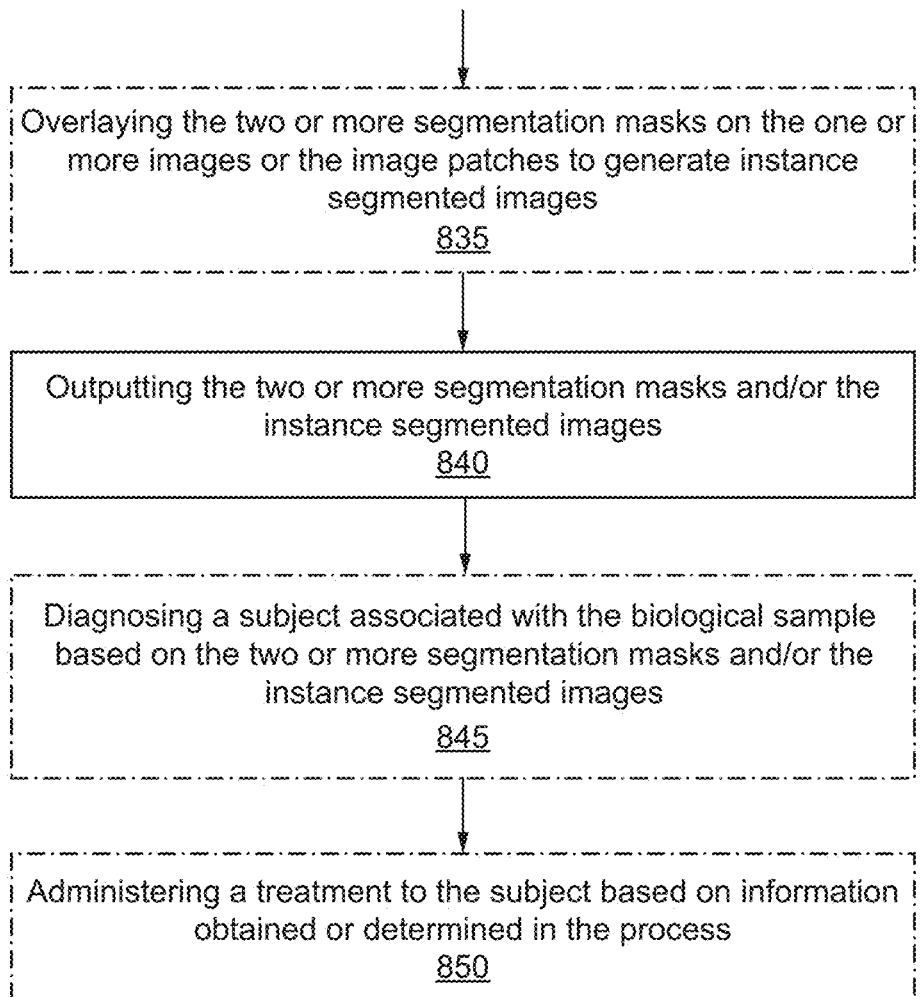
FIG. 8 - Continued

MACHINE LEARNING MODELS FOR CELL LOCALIZATION AND CLASSIFICATION LEARNED USING REPEL CODING

CROSS-REFERENCE TO RELATED APPLICATIONS

The present application is a continuation of International Application No. PCT/US2021/045728, filed on Aug. 12, 2021, which claims the benefit and priority of U.S. Provisional Patent Application No. 63/065,268, filed on Aug. 13, 2020, each of which are hereby incorporated by reference in their entireties for all purposes.

FIELD

The present disclosure relates to digital pathology, and in particular to techniques for using repel coding to effectively train a machine learning model to automatically detect, characterize and/or classify part or all of a digital pathology image.

BACKGROUND

Digital pathology involves scanning of slides (e.g., histopathology or cytopathology glass slides) into digital images interpretable on a computer screen. The tissue and/or cells within the digital images may be subsequently examined by digital pathology image analysis and/or interpreted by a pathologist for a variety of reasons including diagnosis of disease, assessment of a response to therapy, and the development of pharmacological agents to fight disease. In order to examine the tissue and/or cells (which are virtually transparent) within the digital images, the pathology slides may be prepared using various stain assays (e.g., immunohistochemistry) that bind selectively to tissue and/or cellular components. Immunofluorescence (IF) is a technique for analyzing assays that bind to fluorescent dyes to antigens. Multiple assays responding to various wavelengths may be utilized on the same slides. These multiplexed IF slides enable the understanding of the complexity and heterogeneity of the immune context of tumor microenvironments and the potential influence on a tumor's response to immunotherapies. In some assays, the target antigen in the tissue to a stain may be referred to as a biomarker. Thereafter, digital pathology image analysis can be performed on digital images of the stained tissue and/or cells to identify and quantify staining for antigens (e.g., biomarkers indicative of various cells such as tumor cells) in biological tissues.

Machine learning techniques have shown great promise in digital pathology image analysis, such as in cell detection, counting, localization, classification, and patient prognosis. Many computing systems provisioned with machine learning techniques, including convolutional neural networks (CNNs), have been proposed for image classification and digital pathology image analysis, such as cell detection and classification. For example, CNNs can have a series of convolution layers as the hidden layers and this network structure enables the extraction of representational features for object/image classification and digital pathology image analysis. In addition to object/image classification, machine learning techniques have also been implemented for image segmentation. Image segmentation is the process of partitioning a digital image into multiple segments (sets of pixels, also known as image objects). The goal of segmentation is to simplify and/or change the representation of an image into something that is more meaningful and easier to analyze. For example, image segmentation is typically used to locate objects such as cells and boundaries (lines, curves, etc.) in images. To perform image segmentation for large data (e.g., whole slide pathology images), the image is first divided into many small patches. A computing system provisioned with machine learning techniques is trained to classify these patches, and all patches in a same class are combined into one segmented area. Thereafter, machine learning techniques may be further implemented to predict or further classify the segmented area (e.g., positive cells for a given biomarker, negative cells for a given biomarker, or cells that have no stain expression) based on representational features associated with the segmented area.

SUMMARY

Disclosed are methods, systems, and computer readable storage media for using repel coding to effectively train a machine learning model to automatically detect, characterize and/or classify part or all of a digital pathology image.

The methods, systems, and computer readable storage media may be embodied in a variety of ways.

In various embodiments, a computer-implement method comprises: accessing an image for a biological sample, wherein the image depicts cells comprising a staining pattern of a biomarker; inputting the image into a machine learning model, where: the machine learning model comprises a convolutional neural network including an encoder and a decoder, one or more layers of the encoder comprise residual blocks with skip connections, parameters of the machine learning model were learned from training images and label masks for each biomarker in the training images, and the label masks were generated using a repel coding in combination with labels for each of the biomarkers; encoding, by the machine learning model, the image into a feature representation comprising extracted discriminative features; combining, by the machine learning model, feature and spatial information of the cells and the staining pattern of the biomarker through a sequence of up-convolutions and concatenations with the extracted discriminative features from the feature representation; and generating, by the machine learning model, two or more segmentation masks for the biomarker in the image based on the combined feature and spatial information of the cells and the staining pattern of the biomarker, wherein the two or more segmentation masks comprise a positive segmentation mask for cells expressing the biomarker and a negative segmentation mask for cells not expressing the biomarker.

In some embodiments, the method further comprises: overlaying the two or more segmentation masks on the image to generate an instance segmented image; and outputting the instance segmented image.

In some embodiments, the method further comprises: determining, by a user, a diagnosis of a subject associated with the biological sample, wherein the diagnosis is determined based on (i) the cells expressing the biomarker within the instance segmented image, and/or (ii) the cells not expressing the biomarker within the instance segmented image.

In some embodiments, the method further comprises administering, by the user, a treatment to the subject based on (i) the cells expressing the biomarker within the instance segmented image, (ii) the cells not expressing the biomarker within the instance segmented image, and/or (iii) the diagnosis of the subject.

In some embodiments, the image depicts cells comprising a staining pattern of a biomarker and another biomarker, the machine learning model generates two or more segmentation masks for the another biomarker in the image, and the two or more segmentation masks for the another biomarker comprise a positive segmentation mask for cells expressing the another biomarker and a negative segmentation mask for cells not expressing the another biomarker.

In some embodiments, the method further comprises: overlaying the two or more segmentation masks for each of the biomarker and the another biomarker on the image to generate an instance segmented image; and outputting the instance segmented image.

In some embodiments, the generating the label masks comprises: (i) coding cells in each training image using the repel coding, the coding comprises cell centers and a perimeter represented by response decay away from the cell centers, and (ii) generating two or more label masks for each of the biomarkers in the image based on the coding and the labels for each of the biomarkers.

In some embodiments, the combining the feature and spatial information of the cells and the staining pattern of the biomarker, comprises: projecting the extracted discriminative features onto a pixel space, and classifying each pixel space, wherein the classifying comprises cell detection and classification of the cell based on the staining pattern of the biomarker.

In various embodiments, a computer-implement method comprises: accessing images for biological samples, wherein the images depict cells comprising a staining pattern of a biomarker, and wherein the cells are annotated with labels that provide information including: (i) cell centers, and (ii) expression for the biomarker; generating two or more repel coding masks for each of the images, wherein the generating comprises: (i) coding the cells in an image using a repel coding algorithm, wherein output of the coding is an initial cell localization mask comprising the cell centers and a perimeter represented by response decay away from the cell centers, (ii) segmenting the initial cell localization mask using the labels to classify each instance of the cells based on the expression for the biomarker, and (iii) splitting the initial cell localization mask into the two or more repel coding masks based on the segmenting and classification of instance of the cells; labeling each of the images with the two or more repel coding masks to generate a set of training images; training a machine learning algorithm on the set of training images to generate a machine learning model, wherein the training comprises performing iterative operations to learn a set of parameters for segmenting and classifying cells that maximizes or minimizes an objective function, wherein each iteration involves finding the set of parameters for the machine learning algorithm so that a value of the objective function using the set of parameters is larger or smaller than a value of the objective function using another set of parameters in a previous iteration, and wherein the objective function is constructed to measure a difference between segmentation masks predicted using the machine learning algorithm and the two or more repel coding masks for the image; and providing the machine learning model.

In some embodiments, the two or more repel coding masks comprise a positive mask for cells expressing the biomarker and a negative mask for cells not expressing the biomarker.

In some embodiments, the trained machine learning model comprises a convolutional neural network including an encoder and a decoder, and one or more layers of the encoder comprise residual blocks with skip connections.

In some embodiments, the images are image patches of a predetermined size.

In some embodiments, the method further comprises dividing the two or more repel coding masks into mask patches of the predetermined size and labeling each of the image patches with the mask patches to generate a set of training images.

In some embodiments, a method is provided that includes determining, by a user, a diagnosis of a subject based on a result generated by a machine learning model trained using part or all of one or more techniques disclosed herein and potentially selecting, recommending and/or administering a particular treatment to the subject based on the diagnosis.

In some embodiments, a method is provided that includes determining, by a user, a treatment to select, recommend and/or administer to a subject based on a result generated by a machine learning model trained using part or all of one or more techniques disclosed herein.

In some embodiments, a method is provided that includes determining, by a user, whether a subject is eligible to participate in a clinical study or to assign the subject to a particular cohort in a clinical study based on a result generated by a machine learning model trained using part or all of one or more techniques disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims

BRIEF DESCRIPTION OF THE DRAWINGS

Aspects and features of the various embodiments will be more apparent by describing examples with reference to the accompanying drawings, in which.

DETAILED DESCRIPTION

Figure 1:
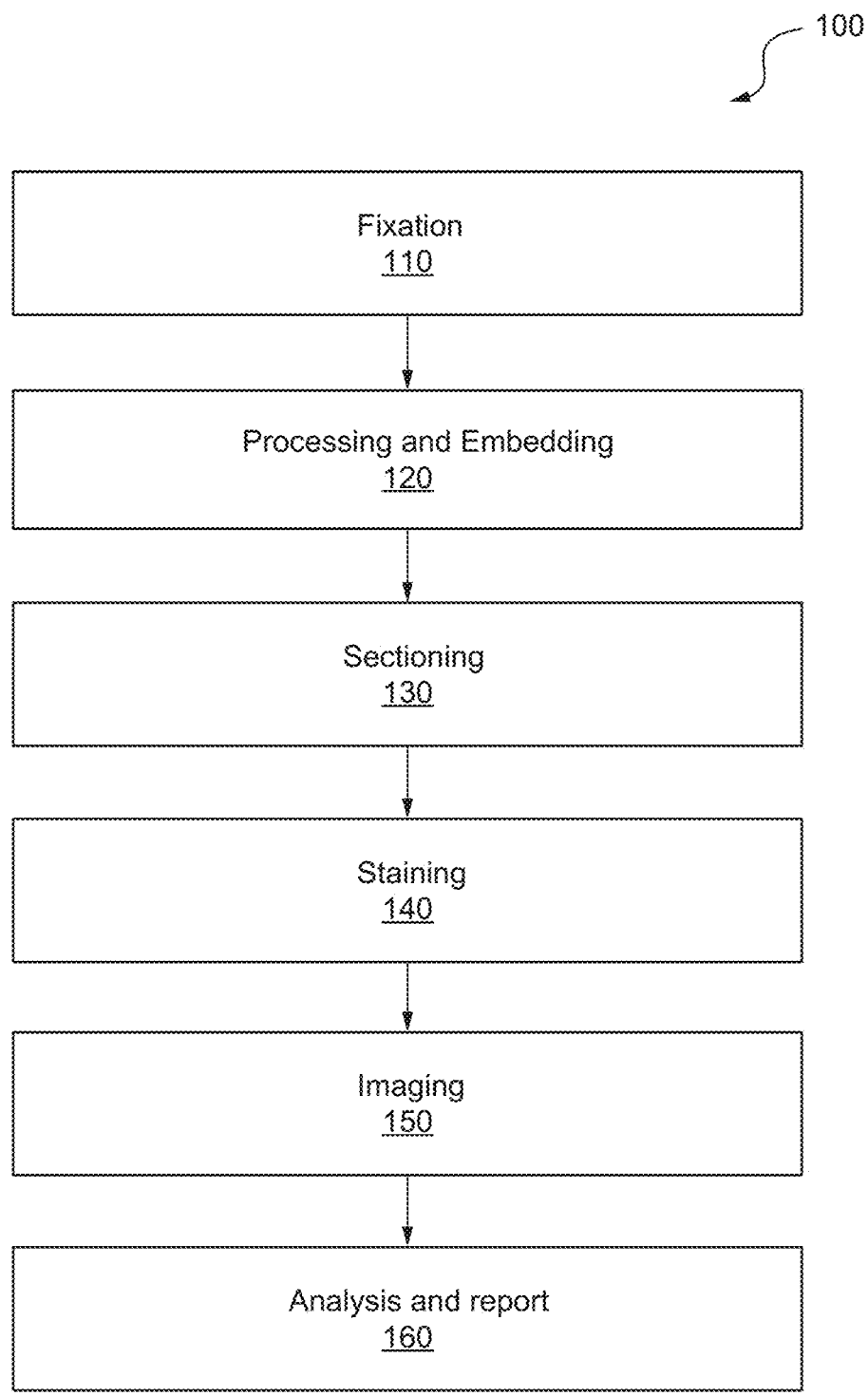
FIG. 1 shows an example of a histological staining process in accordance with various embodiments of the disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

I. Overview

The present disclosure describes techniques for detecting, characterizing, and/or classifying part or all of a digital pathology image. More specifically, some embodiments of the present disclosure provide machine learning techniques for using repel coding to effectively train a machine learning model to automatically detect, characterize, and/or classify cells in biological sample images to support or improve cell analysis.

The ability to characterize biomarkers in cell and tissue samples and to measure heterogeneity of the presence and levels of such biomarkers within and between tissues, may provide valuable information in biomedical science for understanding and characterizing a variety of disease states and/or for the appropriate selection of available targeted therapeutics to a patient's disease state. Further, the ability to discern and characterize the areas in tissue that have different distributions of key biomarkers may provide important information to inform development of targeted and combination therapies. Development and selection of appropriate combination therapies may also be an important factor in preventing relapse.

Automated detection and classification of cells having different biomarker expression levels from digital images has a potential for faster and more accurate extraction of information for diagnosis and treatment of diseases. As most cells and tissues are virtually transparent within their digital images, modern laboratory techniques are developed to help visualize cells and tissues. Immunofluorescence (IF) is a staining technique that help visualize components in tissues or cells. IF uses a combination of antibodies and fluorophores to mark specific proteins and organelles in cell or tissue samples. Therefore, IF technique is widely used in the study of different types of cells, tracking and localizing proteins in cell or tissue samples, and identifying biological structures in cell or tissue samples. It is possible to assess the IF stained cells of a tissue section under a microscope at high magnification and/or to automatically analyze digital images of the biological sample with a digital pathology algorithm. Often, in whole slide analysis, the assessment of the stained biological specimen requires detecting cells or cell structures in the stained biological sample, localizing centers of the cells or cell structures, and performing biomarker identification and biomarker pattern recognition.

After cells become visible for analysis, cell detection and classification techniques are desired. Cell detection and classification techniques have evolved from employing hand-crafted features to machine learning based detection techniques. Most machine learning based cell detection and classification techniques implement a classical feature-based machine learning pipeline in which cell classifiers or detectors are trained in a pixel space, where the locations and features of target cells are labeled. However, accurate cell detection and classification using classical feature-based machine learning is challenging for several reasons. First, the morphology of different cells differs dramatically, and parametric models have to be redesigned and trained to fit different cell targets. Second, even for the same type of cells, different preparation and imaging protocols yield different cell appearances. More importantly, certain types of cells (e.g., immune cells) have a tendency to cluster in groups and cell crowding or density makes it difficult to define boundaries between cells and the related features. The cell crowding or density problem increases the difficulty not only in cell detection, but also in classification.

To address these limitations and problems, various embodiments disclosed herein are directed to machine learning techniques for using repel coding to efficiently train a machine learning model to automatically detect, characterize, and/or classify cells in biological sample images to support or improve cell analysis. The repel coding of raw data labels for the cell detection is based on proximity coding, which is typically used for cell counting. The proximity coding produces local maxima at the cell center. However, with cell detection there is a challenge to distinguish neighboring cells from one another, especially cells that have a tendency to cluster in groups. The proximity coding focuses on entropy and the response valley between neighboring cells is not typically strong enough for accurate cell detection. To overcome this challenge, repel coding is configured to increase the response valley between neighboring cells and more accurately align the local maxima at cell centers as compared to typical proximity coding. Essentially, the repel coding codes for the center of cells in a manner that increases reversibility (obtains a better balance between entropy and reversibility), which allows for the cells to be more readably distinguishable and labeled.

Additionally, the repel coding is configured to apply cell center coding in an intelligent manner based on image labels in order to generate a repel coding mask for each of one or more characteristics associated with the cells. The one or more characteristics may be biomarker staining patterns (e.g., brightfield staining or immunofluorescence (IF)), types of cells (e.g., tumor cells, immune cells, tissue cells, etc.), presence or absence of various organelles such as nuclei or mitochondria, and the like. For example, given a tissue stained for a single biomarker the repel coding may be configured to: (i) code for centers of cells identified as positive for the biomarker by the annotations, and output a repel coding mask for the positive cells, and (ii) code for centers of cells identified as negative for the biomarker by the annotations, and output a repel coding mask for the negative cells. The repel coding masks are then used as labels for the original images to effectively train a machine learning model to automatically detect, characterize, and/or classify cells in biological sample images to support or improve cell analysis. When training a machine learning model on images and/or masks coded with proximity coding, the training tends to merge close cell centers together and place. Whereas when training a machine learning model on images and/or masks coded with repel coding, the training tends to place more emphasis on pixels at the center of the cells (the repel code labels have the more intense pixels at the centers of the cells) and less emphasis on pixels between cell centers (the repel code labels have less intense pixels at the periphery of the cells). As a result, the repel coding emphasizes reversibility criteria and more effectively trains the machine learning model to be able to detect cells.

Further, the repel coding masks which are the actual ground truth values of the corresponding images denote whether the image contains cells, and if so where and what characteristics each cell may have such as a biomarker pattern. The machine learning model encodes the image into a feature representation comprising extracted discriminative features of the cells, and then combines the feature and spatial information of the cells and the staining pattern of the biomarker through a sequence of up-convolutions and concatenations with the extracted discriminative features from the feature representation. The machine learning model generates two or more probability or segmentation masks for each biomarker in the image based on the combined feature and spatial information of the cells and the staining pattern of the biomarker. The cell centers for the two or more probability or segmentation masks are extracted by local maximum detection based on the repel coding. A cost function is used to measure a difference or distance between the output probability or segmentation masks and the ground truth values of the corresponding images (i.e., the repel coding masks). The objective of training the machine learning model is to find model parameters, weights or a structure that minimizes or maximizes the cost function.

Once trained the machine learning model may be used in a computer-implemented method for automatically generating segmentation masks for biomarkers in images. In some instances, the computer-implemented method is performed as part of pre-processing before performing an image analysis algorithm to segment and classify target regions within the images (e.g., tumor cells). In other instances, the computer-implemented method is performed as part of post-processing after performing an image analysis algorithm to segment and classify the target regions within the images (e.g., tumor cells). However, as should be understood by one of ordinary skill in the art, the concepts discussed herein are not limited to pre-processing or post-processing procedures, but may also be integrated into the overall image analysis processing in accordance with various embodiments.

The computer-implemented method may include the use of machine learning models including a convolutional neural network ("CNN") architecture or model that utilizes a two-dimensional segmentation model (a modified U-Net) to automatically detect biological structures such as cells or cell nucleus, and biomarkers such as PD1, before performing a standard image analysis algorithm to learn and recognize target regions. However, this disclosure is not limited to segmenting out only cells, cell nucleus, or biomarkers, the techniques described herein may also be applied to distinguish other organelles, e.g., ribosomes, mitochondria, etc. The convolutional neural network architecture may be trained using pre-labeled images of different biomarker regions or of biomarker positive regions and negative regions. Consequently, a trained convolutional neural network architecture or model may be used to automatically encode images into a feature representation, which can then be masked out from the whole slide analysis before, during, or after inputting images to an image analysis algorithm. The feature representation and extracted features are further combined with spatial information of the biomarkers and biomarker masks are generated accordingly. The image analysis algorithm may further perform classification tasks and outputs classification labels for detected cells or cell structures. Advantageously, this proposed architecture and techniques can improve accuracy of cell detection and biomarker classification via the image analysis algorithm.

II. Definitions

As used herein, when an action is "based on" something, this means the action is based at least in part on at least a part of the something.

As used herein, the terms "substantially," "approximately," and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

As used herein, the term "sample," "biological sample," "tissue," or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "biological material," "biological structure," or "cell structure" refers to natural materials or structures that comprise a whole or a part of a living structure (e.g., a cell nucleus, a cell membrane, cytoplasm, a chromosome, DNA, a cell, a cluster of cells, or the like).

As used herein, a "digital pathology image" refers to a digital image of a stained sample.

As used herein, the term "cell detection" refers to detection of a cell or a cell structure (e.g., a cell nucleus, a cell membrane, cytoplasm, a chromosome, DNA, a cell, a cluster of cells, or the like).

As used herein, the term "target region" refers to a region of an image including image data that is intended be assessed in an image analysis process. Target regions include any region such as tissue regions of an image that is intended to be analyzed in the image analysis process (e.g., tumor cells or staining expressions).

As used herein, the term "tile" or "tile image" refers to a single image corresponding to a portion of a whole image, or a whole slide. In some embodiments, "tile" or "tile image" refers to a region of a whole slide scan or an area of interest having (x,y) pixel dimensions (e.g., 1000 pixels by 1000 pixels). For example, consider a whole image split into M columns of tiles and N rows of tiles, where each tile within the M×N mosaic comprises a portion of the whole image, i.e. a tile at location MI,NI comprises a first portion of an image, while a tile at location M3,N4 comprises a second portion of the image, the first and second portions being different. In some embodiments, the tiles may each have the same dimensions (pixel size by pixel size).

As used herein, the term "patch," "image patch," or "mask patch" refers to a container of pixels corresponding to a portion of a whole image, a whole slide, or a whole mask. In some embodiments, "patch," "image patch," or "mask patch" refers to a region of an image or a mask, or an area of interest having (x,y) pixel dimensions (e.g., 256 pixels by 256 pixels). For example, an image of 1000 pixels by 1000 pixels divided into 100 pixel×100 pixel patches would comprise 10 patches (each patch containing 1000 pixels). In other embodiments, the patches overlap with each "patch," "image patch," or "mask patch" having (x,y) pixel dimensions and sharing one or more pixels with another "patch," "image patch," or "mask patch."

III. Generation of Digital Pathology Images

Histological staining is widely used to highlight features of interest and enhance contrast in sectioned tissues or cells of a biological sample. For example, staining may be used to mark particular types of cells and/or to flag particular types of nucleic acids and/or proteins to aid in the microscopic examination. The stained sample can then be assessed to determine or estimate a quantity of features of interest in the sample (e.g., which may include a count, density or expression level) and/or one or more characteristic of the features of interest (e.g., locations of the features of interest relative to each other or to other features, shape characteristics, etc.). The process of histological staining may include several stages, such as fixation, processing, embedding, sectioning, staining, and imaging.

In some embodiments, an immunohistochemistry staining (e.g., brightfield staining or IF) of tissue sections is a type of histological staining used to identify presence of a particular protein in the biological sample. For example, expression level of a particular protein (e.g., an antigen) is determined by: (a) performing an immunohistochemistry analysis of a sample with a particular antibody type; and (b) determining the presence and/or expression level of the protein in the sample. In some embodiments, immunohistochemistry staining intensity is determined relative to a reference determined from a reference sample (e.g., a control cell line staining sample, a tissue sample from non-cancerous subject, a reference sample known to have a pre-determined level of protein expression).

FIG. 1 illustrates an example of a histological staining process 100. Stage 110 of histological staining process 100 includes sample fixation, which may be used to preserve the sample and slow down sample degradation. In histology, fixation generally refers to an irreversible process of using chemicals to retain the chemical composition, preserve the natural sample structure, and maintain the cell structure from degradation. Fixation may also harden the cells or tissues for sectioning. Fixatives may enhance the preservation of samples and cells using cross-linking proteins. The fixatives may bind to and cross-link some proteins, and denature other proteins through dehydration, which may harden the tissue and inactivate enzymes that might otherwise degrade the sample. The fixatives may also kill bacteria.

The fixatives may be administered, for example, through perfusion and immersion of the prepared sample. Various fixatives may be used, including methanol, a Bouin fixative and/or a formaldehyde fixative, such as neutral buffered formalin (NBF) or paraffin-formalin (paraformaldehyde-PFA). In cases where a sample is a liquid sample (e.g., a blood sample), the sample may be smeared onto a slide and dried prior to fixation.

While the fixing process may serve to preserve the structure of the samples and cells for the purpose of histological studies, the fixation may result in concealing of tissue antigens thereby decreasing antigen detection. Thus, the fixation is generally considered as a limiting factor for immunohistochemistry because formalin can cross-link antigens and mask epitopes. In some instances, an additional process is performed to reverse the effects of cross-linking, including treating the fixed sample with citraconic anhydride (a reversible protein cross-linking agent) and heating.

Stage 120 of histological staining process 100 includes sample processing and embedding. Sample processing may include infiltrating a fixed sample (e.g., a fixed tissue sample) with a suitable histological wax, such as paraffin wax. The histological wax may be insoluble in water or alcohol, but may be soluble in a paraffin solvent, such as xylene. Therefore, the water in the tissue may need to be replaced with xylene. To do so, the sample may be dehydrated first by gradually replacing water in the sample with alcohol, which can be achieved by passing the tissue through increasing concentrations of ethyl alcohol (e.g., from 0 to about 100%). After the water is replaced by alcohol, the alcohol may be replaced with xylene, which is miscible with alcohol. Embedding may include embedding the sample in warm paraffin wax. Because the paraffin wax may be soluble in xylene, the melted wax may fill the space that is filled with xylene and was filled with water before. The wax filled sample may be cooled down to form a hardened block that can be clamped into a microtome for section cutting. In some cases, deviation from the above example procedure results in an infiltration of paraffin wax that leads to inhibition of the penetration of antibody, chemical, or other fixatives.

Stage 130 of histological staining process 100 includes sample sectioning. Sectioning is the process of cutting thin slices of a sample (e.g., an embedded and fixed tissue sample) from an embedding block for the purpose of mounting it on a microscope slide for examination. Sectioning may be performed using a microtome. In some cases, tissues can be frozen rapidly in dry ice or Isopentane, and can then be cut in a refrigerated cabinet (e.g., a cryostat) with a cold knife. Other types of cooling agents can be used to freeze the tissues, such as liquid nitrogen. The sections for use with brightfield and fluorescence microscopy are generally on the order of 4-10 μm thick. In some cases, sections can be embedded in an epoxy or acrylic resin, which may enable thinner sections (e.g., <2 μm) to be cut. The sections may then be mounted on one or more glass slides. A coverslip may be placed on top to protect the sample section.

Stage 140 of histological staining process 100 includes staining (of sections of tissue samples or of fixed liquid samples). The purpose of staining is to identify different sample components through the color reactions. Most cells are colorless and transparent. Therefore, histological sections may need to be stained to make the cells visible. The staining process generally involves adding a dye or stain to a sample to qualify or quantify the presence of a specific compound, a structure, a molecule, or a feature (e.g., a subcellular feature). For example, stains can help to identify or highlight specific biomarkers from a tissue section. In other example, stains can be used to identify or highlight biological tissues (e.g., muscle fibers or connective tissue), cell populations (e.g., different blood cells), or organelles within individual cells.

Many staining solutions are aqueous. Thus, to stain tissue sections, wax may need to be dissolved and replaced with water (rehydration) before a staining solution is applied to a section. For example, the section may be sequentially passed through xylene, decreasing concentration of ethyl alcohol (from about 100% to 0%), and water. Once stained, the sections may be dehydrated again and placed in xylene. The section may then be mounted on microscope slides in a mounting medium dissolved in xylene. A coverslip may be placed on top to protect the sample section. The evaporation of xylene around the edges of the coverslip may dry the mounting medium and bond the coverslip firmly to the slide.

Various types of staining protocols may be used to perform the staining. For example, an exemplary immunohistochemistry staining protocol includes using a hydrophobic barrier line around the sample (e.g., tissue section) to prevent leakage of reagents from the slide during incubation, treating the tissue section with reagents to block endogenous sources of nonspecific staining (e.g., enzymes, free aldehyde groups, immunoglobins, other irrelevant molecules that can mimic specific staining), incubating the sample with a permeabilization buffer to facilitate penetration of antibodies and other staining reagents into the tissue, incubating the tissue section with a primary antibody for a period of time (e.g., 1-24 hours) at a particular temperature (e.g., room temperature, 6-8° C.), rinsing the sample using wash buffer, incubating the sample (tissue section) with a secondary antibody for another period of time at another particular temperature (e.g., room temperature), rinsing the sample again using water buffer, incubating the rinsed sample with a chromogen (e.g., DAB), and washing away the chromogen to stop the reaction. In some instances, counterstaining is subsequently used to identify an entire "landscape" of the sample and serve as a reference for the main color used for the detection of tissue targets. Examples of the counterstains may include hematoxylin (stains from blue to violet), Methylene blue (stains blue), toluidine blue (stains nuclei deep blue and polysaccharides pink to red), nuclear fast red (also called Kernechtrot dye, stains red), and methyl green (stains green); non-nuclear chromogenic stains, such as eosin (stains pink), etc. A person of ordinary skill in the art will recognize that other immunohistochemistry staining techniques can be implemented to perform staining.

In another example, an H&E staining protocol can be performed for the tissue section staining. The H&E staining protocol includes applying hematoxylin stain mixed with a metallic salt, or mordant to the sample. The sample can then be rinsed in a weak acid solution to remove excess staining (differentiation), followed by bluing in mildly alkaline water. After the application of hematoxylin, the sample can be counterstained with eosin. It will be appreciated that other H&E staining techniques can be implemented.

In some embodiments, various types of stains can be used to perform staining, depending on which features of interest is targeted. For example, DAB can be used for various tissue sections for the IHC staining, in which the DAB results a brown color depicting a feature of interest in the stained image. In another example, alkaline phosphatase (AP) can be used for skin tissue sections for the IHC staining, since DAB color may be masked by melanin pigments. With respect to primary staining techniques, the applicable stains may include, for example, basophilic and acidophilic stains, hematin and hematoxylin, silver nitrate, trichrome stains, and the like. Acidic dyes may react with cationic or basic components in tissues or cells, such as proteins and other components in the cytoplasm. Basic dyes may react with anionic or acidic components in tissues or cells, such as nucleic acids. As noted above, one example of a staining system is H&E. Eosin may be a negatively charged pink acidic dye, and hematoxylin may be a purple or blue basic dye that includes hematein and aluminum ions. Other examples of stains may include periodic acid-Schiff reaction (PAS) stains, Masson's trichrome, Alcian blue, van Gieson, Reticulin stain, and the like. In some embodiments, different types of stains may be used in combination.

Stage 150 of histological staining process 100 includes medical imaging. A microscope (e.g., an electron or optical microscope) can be used to magnify the stained sample. For example, optical microscopes may have a resolution less than 1 μm, such as about a few hundred nanometers. To observe finer details in nanometer or sub-nanometer ranges, electron microscopes may be used. An imaging device (combined with the microscope or separate from the microscope) images the magnified biological sample to obtain the image data, such as a multi-channel image (e.g., a multi-channel fluorescent) with several (such as between ten to sixteen for example) channels. The imaging device may include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the imaging device can include a plurality of lenses that cooperate to prove on-the-fly focusing. An image sensor, for example, a CCD sensor can capture a digital image of the biological sample. In some embodiments, the imaging device is a brightfield imaging system, a multispectral imaging (MSI) system or a fluorescent microscopy system. The imaging device may utilize nonvisible electromagnetic radiation (UV light, for example) or other imaging techniques to capture the image. For example, the imaging device may comprise a microscope and a camera arranged to capture images magnified by the microscope. The image data received by the analysis system may be identical to and/or derived from raw image data captured by the imaging device.

At stage 160, the images of the stained sections are stored. The images may be stored locally, remotely, and/or in a cloud server. Each image may be stored in association with an identifier of a subject and a date (e.g., a date when a sample was collected and/or a date when the image was captured). An image may further be transmitted to another system (e.g., a system associated with a pathologist or an automated or semi-automated image analysis system).

It will be appreciated that modifications to process 100 are contemplated. For example, if a sample is a liquid sample, stage 120 (processing and embedding) and/or stage 130 (sectioning) may be omitted from the process.

IV. Exemplary Process Flow for Digital Pathology Image Transformation

Figure 2:
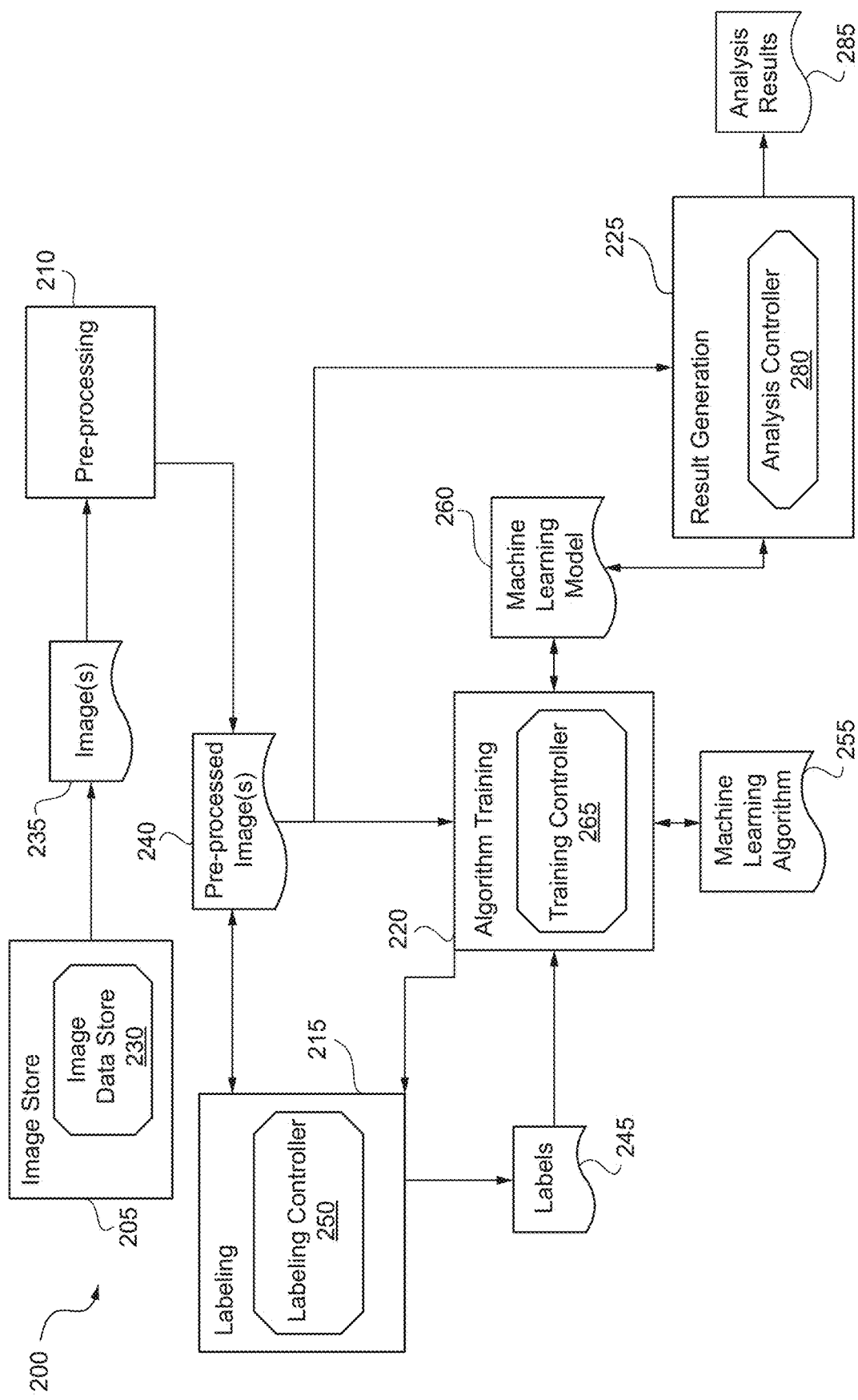
FIG. 2 shows a block diagram that illustrates a computing environment for processing digital pathology images using a machine learning model in accordance with various embodiments of the disclosure.

FIG. 2 shows a block diagram that illustrates a computing environment 200 for processing digital pathology images using a machine learning model. As further described herein, processing a digital pathology image can include using the digital pathology image to train a machine learning algorithm or transforming part or all of the digital pathology image into one or more results using a trained (or partly trained) version of the machine learning algorithm (i.e., a machine learning model).

As shown in FIG. 2, computing environment 200 includes several stages: an image store stage 205, a pre-processing stage 210, a labeling stage 215, a training stage 220, and a result generation stage 225.

The image store stage 205 includes one or more image data stores 230 that are accessed (e.g., by pre-processing stage 210) to provide a set of digital images 235 of preselected areas from or the entirety of the biological sample slides (e.g., tissue slides). Each digital image 235 stored in each image data store 230 and accessed at image store stage 210 may include a digital pathology image generated in accordance with part or all of process 100 depicted in FIG. 1. In some embodiments, each digital image 235 includes image data from one or more scanned slides. Each of the digital images 235 may correspond to image data from a single specimen and/or a single day on which the underlying image data corresponding to the image was collected.

The image data may include an image, as well as any information related to color channels or color wavelength channels, as well as details regarding the imaging platform on which the image was generated. For instance, a tissue section may need to be stained by means of application of a staining assay containing one or more different biomarkers associated with chromogenic stains for brightfield imaging or fluorophores for fluorescence imaging. Staining assays can use chromogenic stains for brightfield imaging, organic fluorophores, quantum dots, or organic fluorophores together with quantum dots for fluorescence imaging, or any other combination of stains, biomarkers, and viewing or imaging devices. Example biomarkers include biomarkers for estrogen receptors (ER), human epidermal growth factor receptors 2 (HER2), human Ki-67 protein, progesterone receptors (PR), programmed cell death protein 1 ("PD1"), and the like, where the tissue section is detectably labeled with binders (e.g., antibodies) for each of ER, HER2, Ki-67, PR, PD1, etc. In some embodiments, digital image and data analysis operations such as classifying, scoring, cox modeling, and risk stratification are dependent upon the type of biomarker being used as well as the field-of-view (FOV) selection and annotations. Moreover, a typical tissue section is processed in an automated staining/assay platform that applies a staining assay to the tissue section, resulting in a stained sample. There are a variety of commercial products on the market suitable for use as the staining/assay platform, one example being the VENTANA SYMPHONY product of the assignee Ventana Medical Systems, Inc. Stained tissue sections may be supplied to an imaging system, for example on a microscope or a whole-slide scanner having a microscope and/or imaging components, one example being the VENTANA iScan Coreo product of the assignee Ventana Medical Systems, Inc. Multiplex tissue slides may be scanned on an equivalent multiplexed slide scanner system. Additional information provided by the imaging system may include any information related to the staining platform, including a concentration of chemicals used in staining, a reaction times for chemicals applied to the tissue in staining, and/or pre-analytic conditions of the tissue, such as a tissue age, a fixation method, a duration, how the section was embedded, cut, etc.

At the pre-processing stage 210, each of one, more, or all of the set of digital images 235 are pre-processed using one or more techniques to generate a corresponding pre-processed image 240. The pre-processing may comprise cropping the images. In some instances, the pre-processing may further comprise standardization or rescaling (e.g., normalization) to put all features on a same scale (e.g., a same size scale or a same color scale or color saturation scale). In certain instances, the images are resized with a minimum size (width or height) of predetermined pixels (e.g., 2500 pixels) or with a maximum size (width or height) of predetermined pixels (e.g., 3000 pixels) and optionally kept with the original aspect ratio. The pre-processing may further comprise removing noise. For example, the images may be smoothed to remove unwanted noise such as by applying a Gaussian function or Gaussian blur.

The pre-processed images 240 may include one or more training images, validation input images, and unlabeled images. It should be appreciated that the pre-processed images 240 corresponding to the training, validation and unlabeled groups need not be accessed at a same time. For example, an initial set of training and validation pre-processed images 240 may first be accessed and used to train a machine learning algorithm 255, and unlabeled input image elements may be subsequently accessed or received (e.g., at a single or multiple subsequent times) and used by a trained machine learning model 260 to provide desired output (e.g., cell classification).

In some instances, the machine learning algorithms 255 are trained using supervised training, and some or all of the pre-processed images 240 are partly or fully labeled manually, semi-automatically, or automatically at labeling stage 215 with labels 245 that identify a "correct" interpretation (i.e., the "ground-truth") of various biological material and structures within the pre-processed images 240. For example, the label 245 may identify a feature of interest (for example) a classification of a cell, a binary indication as to whether a given cell is a particular type of cell, a binary indication as to whether the pre-processed image 240 (or a particular region with the pre-processed image 240) includes a particular type of depiction (e.g., necrosis or an artifact), a categorical characterization of a slide-level or region-specific depiction (e.g., that identifies a specific type of cell), a number (e.g., that identifies a quantity of a particular type of cells within a region, a quantity of depicted artifacts, or a quantity of necrosis regions), presence or absence of one or more biomarkers, etc. In some instances, a label 245 includes a location. For example, a label 245 may identify a point location of a nucleus of a cell of a particular type or a point location of a cell of a particular type (e.g., raw dot labels). As another example, a label 245 may include a border or boundary, such as a border of a depicted tumor, blood vessel, necrotic region, etc. As another example, a label 245 may include one or more biomarkers identified based on biomarker patterns observed using one or more stains. For example, a tissue slide stained for a biomarker, e.g., programmed cell death protein 1 ("PD1"), may be observed and/or processed in order to label cells as either positive cells or negative cells in view of expression levels and patterns of PD1 in the tissue. Depending on a feature of interest, a given labeled pre-processed image 240 may be associated with a single label 245 or multiple labels 245. In the latter case, each label 245 may be associated with (for example) an indication as to which position or portion within the pre-processed image 245 the label corresponds A label 245 assigned at labeling stage 215 may be identified based on input from a human user (e.g., pathologist or image scientist) and/or an algorithm (e.g., an annotation tool) configured to define a label 245. In some instances, labeling stage 215 can include transmitting and/or presenting part or all of one or more pre-processed images 240 to a computing device operated by the user. In some instances, labeling stage 215 includes availing an interface (e.g., using an API) to be presented by labeling controller 250 at the computing device operated by the user, where the interface includes an input component to accept input that identifies labels 245 for features of interest. For example, a user interface may be provided by the labeling controller 250 that enables selection of an image or region of an image (e.g., FOV) for labeling. A user operating the terminal may select an image or FOV using the user interface. Several image or FOV selection mechanisms may be provided, such as designating known or irregular shapes, or defining an anatomic region of interest (e.g., tumor region). In one example, the image or FOV is a whole-tumor region selected on an IHC slide stained with an Hematoxylin and Eosin (H&E) stain combination. The image or FOV selection may be performed by a user or by automated image-analysis algorithms, such as tumor region segmentation on an H&E tissue slide, etc. For example, a user may select that the image or FOV as the whole slide or the whole tumor, or the whole slide or whole tumor region may be automatically designated as the image or FOV using a segmentation algorithm. Thereafter, the user operating the terminal may select one or more labels 245 to be applied to the selected image or FOV such as point location on a cell, a positive marker for a biomarker expressed by a cell, a negative biomarker for a biomarker not expressed by a cell, a boundary around a cell, and the like.

In some instances, the interface may identify which and/or a degree to which particular label(s) 245 are being requested, which may be conveyed via (for example) text instructions and/or a visualization to the user. For example, a particular color, size and/or symbol may represent that a label 245 is being requested for a particular depiction (e.g., a particular cell or region or staining pattern) within the image relative to other depictions. If labels 245 corresponding to multiple depictions are to be requested, the interface may concurrently identify each of the depictions or may identify each depiction sequentially (such that provision of a label for one identified depiction triggers an identification of a next depiction for labeling). In some instances, each image is presented until the user has identified a specific number of labels 245 (e.g., of a particular type). For example, a given whole-slide image or a given patch of a whole-slide image may be presented until the user has identified the presence or absence of three different biomarkers, at which point the interface may present an image of a different whole-slide image or different patch (e.g., until a threshold number of images or patches are labeled). Thus, in some instances, the interface is configured to request and/or accept labels 245 for an incomplete subset of features of interest, and the user may determine which of potentially many depictions will be labeled.

In some instances, labeling stage 215 includes labeling controller 250 implementing an annotation algorithm in order to semi-automatically or automatically label various features of an image or a region of interest within the image. For example, intensities across an image (e.g., a pre-processed image) may be normalized or regularized, intensities may be thresholded or filtered, and/or an algorithm (e.g., configured to detect objects, lines and/or shapes such as Equation (1)) may be applied. Each boundary, point location, or location coding may then be identified as a feature of interest. In some instances, a metric is associated with each feature of interest (e.g., a metric indicating a confidence of locating the feature of interest), and a level of interest may scale based on the metric. In accordance with aspects of the present disclosure, the annotation algorithm may configured to use a coding scheme to localize a feature of interest (e.g., localize where exactly the object is present in the image). Localizing a feature of interest may include predicting a point location and/or boundary for the feature of interest. For example, the localization may include identifying or predicting a point location corresponding to each depicted cell and/or identifying or predicting a closed shape corresponding to each depicted cell. In certain instances, the localization techniques include coding raw dot labels into a mask (e.g., a label 245 for locations of objects such as cells) using a repel coding scheme. The repel coding scheme is defined as follows:

$$D'_{ij} = dist^1_{ij} \times (1 + dist^1_{ij}/dist^2_{ij})^2, \quad \text{Equation (1)}$$

$$C_{ij} = \begin{cases} \dfrac{1}{1+\alpha D'_{ij}} & \text{if } D'_{ij} r \\ 0, & \text{otherwise,} \end{cases}$$

where $dist_{ij}^1$ is the distance of the pixel (i,j) to its nearest cell center, and $dist_{ij}^2$ is the distance of the pixel (i,j) to its second nearest cell center. The intermediate variable can be taken as $dist_{ij}^1$ suppressed by $dist_{ij}^2$.

The label masks may be generated using the repel coding scheme in combination with annotations for each of the biomarkers. For example, the localization technique may include: coding raw dot labels into an initial cell localization mask (e.g., a label 245 for locations of cells) using a repel coding as defined in Equation (1), segmenting the initial cell localization mask using label annotations for one or more biomarkers based on biomarker staining patterns, and outputting two or more repel coding masks for each biomarker (e.g., one mask for positive cells and one mask for negative cells). The segmenting is an instance segmentation where along with pixel level classification for localization, the algorithm further classifies each instance of a class separately (e.g., positive cells for PD1, negative cells for PD1, positive cells for HER2, negative cells for HER2, etc.). For example, given a tissue stained for a single biomarker the repel coding scheme may be configured to: (i) code for centers of cells identified as positive for the biomarker by the annotations, and output a repel coding mask for the positive cells, and (ii) code for centers of cells identified as negative for the biomarker by the annotations, and output a repel coding mask for the negative cells. By way of a another example, given a tissue stained for two biomarkers the repel coding may be configured to: (i) code for centers of cells identified as positive for the first biomarker by the annotations, and output a repel coding mask for the positive cells, (ii) code for centers of cells identified as negative for the first biomarker by the annotations, and output a repel coding mask for the negative cells, (iii) code for centers of cells identified as positive for the second biomarker by the annotations, and output a repel coding mask for the positive cells, and (iv) code for centers of cells identified as negative for the second biomarker by the annotations, and output a repel coding mask for the negative cells. By way of a another example, given a tissue stained for a single biomarker the repel coding may be configured to: (i) code for centers of cells identified as positive for the biomarker by the annotations, and output a repel coding mask for the positive cells (e.g., tumor cells), (ii) code for centers of cells identified as negative for the biomarker by the annotations, and output a repel coding mask for the negative cells (e.g., immune cells), and (iii) code for centers of cells identified as tissue cells by the annotations, and output a repel coding mask for the tissue cells.

In some instances, the labeling controller 250 annotates the image or FOV on a first slide in accordance with the input from the user or the annotation algorithm and maps the annotations across a remainder of the slides. Several methods for annotation and registration are possible, depending on the defined FOV. For example, a whole tumor region annotated on a H&E slide from among the plurality of serial slides may be selected automatically or by a user on an interface such as VIRTUOSO/VERSO™ or similar. Since the other tissue slides correspond to serial sections from the same tissue block, the labeling controller 250 executes an inter-marker registration operation to map and transfer the whole tumor annotations from the H&E slide to each of the remaining IHC slides in a series. Exemplary methods for inter-marker registration are described in further detail in commonly-assigned and co-pending application WO2014140070A2, "Whole slide image registration and cross-image annotation devices, systems and methods", filed Mar. 12, 2014, which is hereby incorporated by reference in its entirety for all purposes. In some embodiments, any other method for image registration and generating whole-tumor annotations may be used. For example, a qualified reader such as a pathologist may annotate a whole-tumor region on any other IHC slide, and execute the labeling controller 250 to map the whole tumor annotations on the other digitized slides. For example, a pathologist (or automatic detection algorithm) may annotate a whole-tumor region on an H&E slide triggering an analysis of all adjacent serial sectioned IHC slides to determine whole-slide tumor scores for the annotated regions on all slides At training stage 220, labels 245 and corresponding pre-processed images 240 can be used by the training controller 265 to train machine learning algorithm(s) 255. In some instances, the machine learning algorithm 255 includes a CNN, a modified CNN with encoding layers substituted by a residual neural network ("Resnet"), or a modified CNN with encoding and decoding layers substituted by a Resnet. In other instances, the machine learning algorithm 255 can be any suitable machine learning algorithm configured to localize, classify, and or analyze pre-processed images 240, such as a two-dimensional CNN ("2DCNN"), a Mask R-CNN, Feature Pyramid Network (FPN), a dynamic time warping ("DTW") technique, a hidden Markov model ("HMM"), etc., or combinations of one or more of such techniques—e.g., CNN-HMM or MCNN (Multi-Scale Convolutional Neural Network). The computing environment 200 may employ the same type of machine learning algorithm or different types of machine learning algorithms trained to detect and classify different cells. For example, computing environment 200 can include a first machine learning algorithm (e.g., a U-Net) for detecting and classifying PD1. The computing environment 200 can also include a second machine learning algorithm (e.g., a 2DCNN) for detecting and classifying Cluster of Differentiation 68 ("CD68"). The computing environment 200 can also include a third machine learning algorithm (e.g., a U-Net) for combinational detecting and classifying PD1 and CD68. The computing environment 200 can also include a fourth machine learning algorithm (e.g., a HMM) for diagnosis of disease for treatment or a prognosis for a subject such as a patient. Still other types of machine learning algorithms may be implemented in other examples according to this disclosure.

In some embodiments, the training stage includes a parameter data store and a trainer controller, which are collectively used to train the machine learning algorithms 255 based on training data (e.g., labels 245 and corresponding pre-processed images 240) and optimize the parameters of the machine learning algorithms 255 during supervised or unsupervised training. In some instances, the training process includes iterative operations to learn a set of parameters (e.g., one or more coefficients and/or weights) for the machine learning algorithms 255. Each parameter may be a tunable variable, such that a value for the parameter is adjusted during training. For example, a cost function or objective function may be configured to optimize accurate classification of depicted representations, optimize characterization of a given type of feature (e.g., characterizing a shape, size, uniformity, etc.), optimize detection of a given type of feature, and/or optimize accurate localization of a given type of feature. Each iteration can involve learning a set of parameters for the machine learning algorithms 255 that minimizes or maximizes a cost function for the machine learning algorithms 255 so that the value of the cost function using the set of parameters is smaller or larger than the value of the cost function using another set of parameters in a previous iteration. The cost function can be constructed to measure the difference between the outputs predicted using the machine learning algorithms 255 and the labels 245 contained in the training data. Once the set of parameters are identified, the machine learning algorithms 255 has been trained and can be utilized for localization and/or classification as designed.

The training iterations continue until a stopping condition is satisfied. The training-completion condition may be configured to be satisfied when (for example) a predefined number of iterations have been completed, a statistic generated based on testing or validation exceeds a predetermined threshold (e.g., a classification accuracy threshold), a statistic generated based on confidence metrics (e.g., an average or median confidence metric or a percentage of confidence metrics that are above a particular value) exceeds a predefined confidence threshold, and/or a user device that had been engaged in training review closes a training application executed by the training controller 265. In some instances, new training iterations may be initiated in response to receiving a corresponding request from a user device or a triggering condition (e.g., drift is determined within a trained machine learning model 260).

The trained machine learning model 260 can then be used (at result generation stage 225) to process new pre-processed images 240 to generate predictions or inferences such as predict cell centers and/or location probabilities, classify cell types, generate cell masks (e.g., pixel-wise segmentation masks of the image), predict a diagnosis of disease or a prognosis for a subject such as a patient, or a combination thereof. In some instances, the masks identify a location of depicted cells associated with one or more biomarkers. For example, given a tissue stained for a single biomarker the trained machine learning model 260 may be configured to: (i) infer centers and/or locations of cells, (ii) classify cells based on features of a staining pattern associated with the biomarker, and (iii) output a cell detection mask for the positive cells and a cell detection mask for the negative cells. By way of a another example, given a tissue stained for two biomarkers the trained machine learning model 260 may be configured to: (i) infer centers and/or locations of cells, (ii) classify cells based on features of staining patterns associated with the two biomarkers, and (iii) output a cell detection mask for cells positive for the first biomarker, a cell detection mask for cells negative for the first biomarker, a cell detection mask for cells positive for the second biomarker, and a cell detection mask for cells negative for the second biomarker. By way of a another example, given a tissue stained for a single biomarker the trained machine learning model 260 may be configured to: (i) infer centers and/or locations of cells, (ii) classify cells based on features of cells and a staining pattern associated with the biomarker, and (iii) output a cell detection mask for the positive cells and a cell detection mask for the negative cells code, and a mask cells classified as tissue cells.

In some instances, an analysis controller 280 generates analysis results 285 that are availed to an entity that requested processing of an underlying image. The analysis result(s) 285 may include the masks output from the trained machine learning models 260 overlaid on the new pre-processed images 240. Additionally or alternatively, the analysis results 285 may include information calculated or determined from the output of the trained machine learning models such as whole-slide tumor scores. In exemplary embodiments, the automated analysis of tissue slides use the assignee VENTANA's FDA-cleared 510(k) approved algorithms. Alternatively or in addition, any other automated algorithms may be used to analyze selected regions of images (e.g., masked images) and generate scores. In some embodiments, the analysis controller 280 may further respond to instructions of a pathologist, physician, investigator (e.g., associated with a clinical trial), subject, medical professional, etc. received from a computing device. In some instances, a communication from the computing device includes an identifier of each of a set of particular subjects, in correspondence with a request to perform an iteration of analysis for each subject represented in the set. The computing device can further perform analysis based on the output(s) of the machine learning model and/or the analysis controller 280 and/or provide a recommended diagnosis/treatment for the subject(s).

It will be appreciated that the computing environment 200 is exemplary, and the computing environment 200 with different stages and/or using different components are contemplated. For example, in some instances, a network may omit pre-processing stage 210, such that the images used to train a algorithm and/or an image processed by a model are raw images (e.g., from image data store). As another example, it will be appreciated that each of pre-processing stage 210 and training stage 220 can include a controller to perform one or more actions described herein. Similarly, while labeling stage 215 is depicted in association with labeling controller 250 and while result generation stage 225 is depicted in association with analysis controller 280, a controller associated with each stage may further or alternatively facilitate other actions described herein other than generation of labels and/or generation of analysis results. As yet another example, the depiction of computing environment 200 shown in FIG. 2 lacks a depicted representation of a device associated with a programmer (e.g., that selected an architecture for machine learning algorithm 255, defined how various interfaces would function, etc.), a device associated with a user providing initial labels or label review (e.g., at labeling stage 215), and a device associated with a user requesting model processing of a given image (which may be a same user or a different user as one who had provided initial labels or label reviews). Despite the lack of the depiction of these devices, computing environment 200 may involve the use one, more or all of the devices and may, in fact, involve the use of multiple devices associated with corresponding multiple users providing initial labels or label review and/or multiple devices associated with corresponding multiple users requesting model processing of various images.

V. Techniques for Automated Object Localization and Classification

Automated instance segmentation (e.g., localization and classification of cells) of digital images provides meaningful information for images analysis in the biomedical industry and plays a vital role in diagnosis and treatment of diseases. For example, automated localization and classification of programmed cell death protein 1 ("PD1") positive cells and negative cells based on expression levels and patterns of PD1 in a biological sample can be used to determine complex immunological status of the sample subject and diagnosis of diseases. The accuracy of generated segmentation masks for objects such as cells depends on corresponding machine learning models, and the performance of the machine learning models depends on training and the architecture of the machine learning algorithms. In various embodiments, the performance of the machine learning models is optimized by training the machine learning algorithms using images labeled with masks generated by a repel coding scheme that takes into consideration various biomarker staining patterns observed in the images. Further, in some embodiments, the performance of the machine learning models is optimized by using a U-Net architecture that has been modified using residual blocks with skip connections in order to not only localize objects but also apprehend complicated features for multi-class segmentation.

V.A. Exemplary Repel Coding Scheme for Object Localization and Classification

Figure 3:
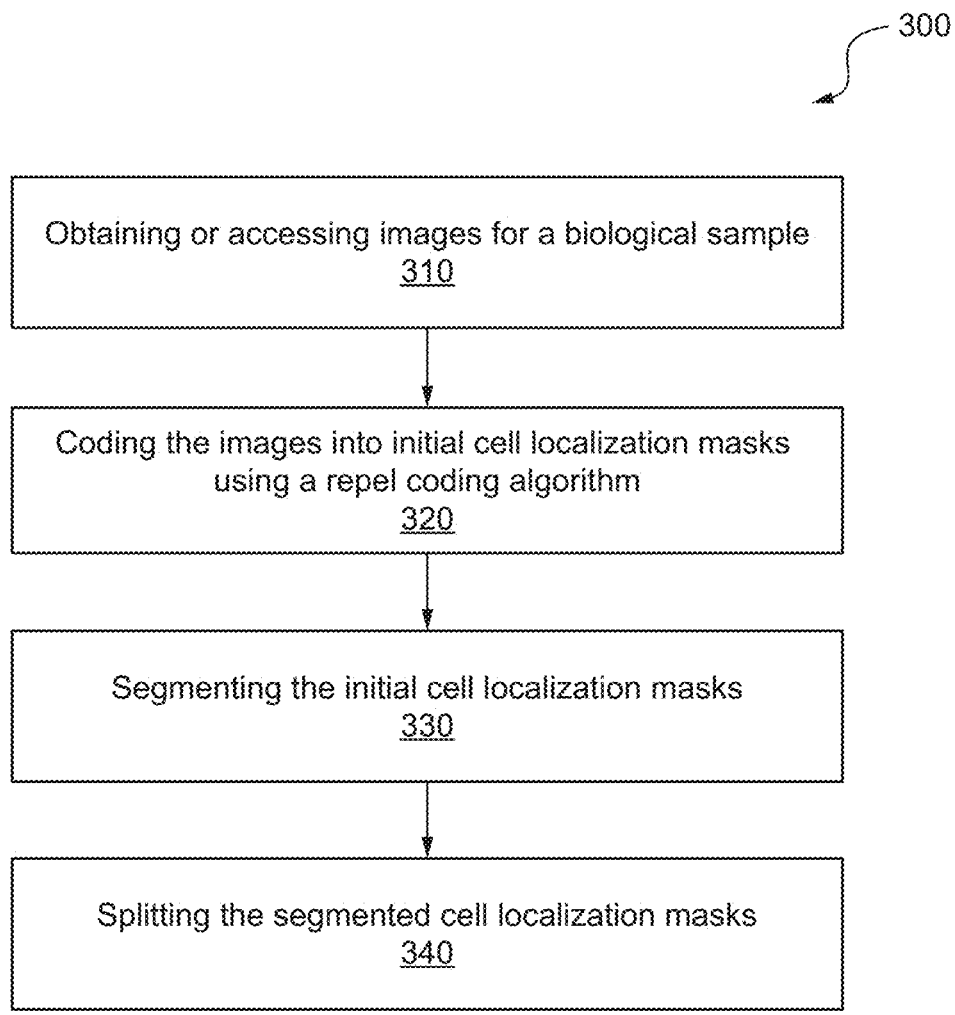
FIG. 3 shows a flowchart illustrating a process for implementing a repel coding scheme to generate repel coding masks to be used in training machine learning algorithms in accordance with various embodiments of the disclosure.

FIG. 3 shows a flowchart illustrating a process 300 for implementing a repel coding scheme to generate repel coding masks to be used in training machine learning algorithms in accordance with various embodiments. The process 300 depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 2, the processing depicted in FIG. 3 may be performed by a pre-processing or labeling subsystem (e.g., computing environment 200) to generate repel coding masks for training by one or more machine learning algorithms (e.g., the machine learning algorithms 255).

Figure 4:
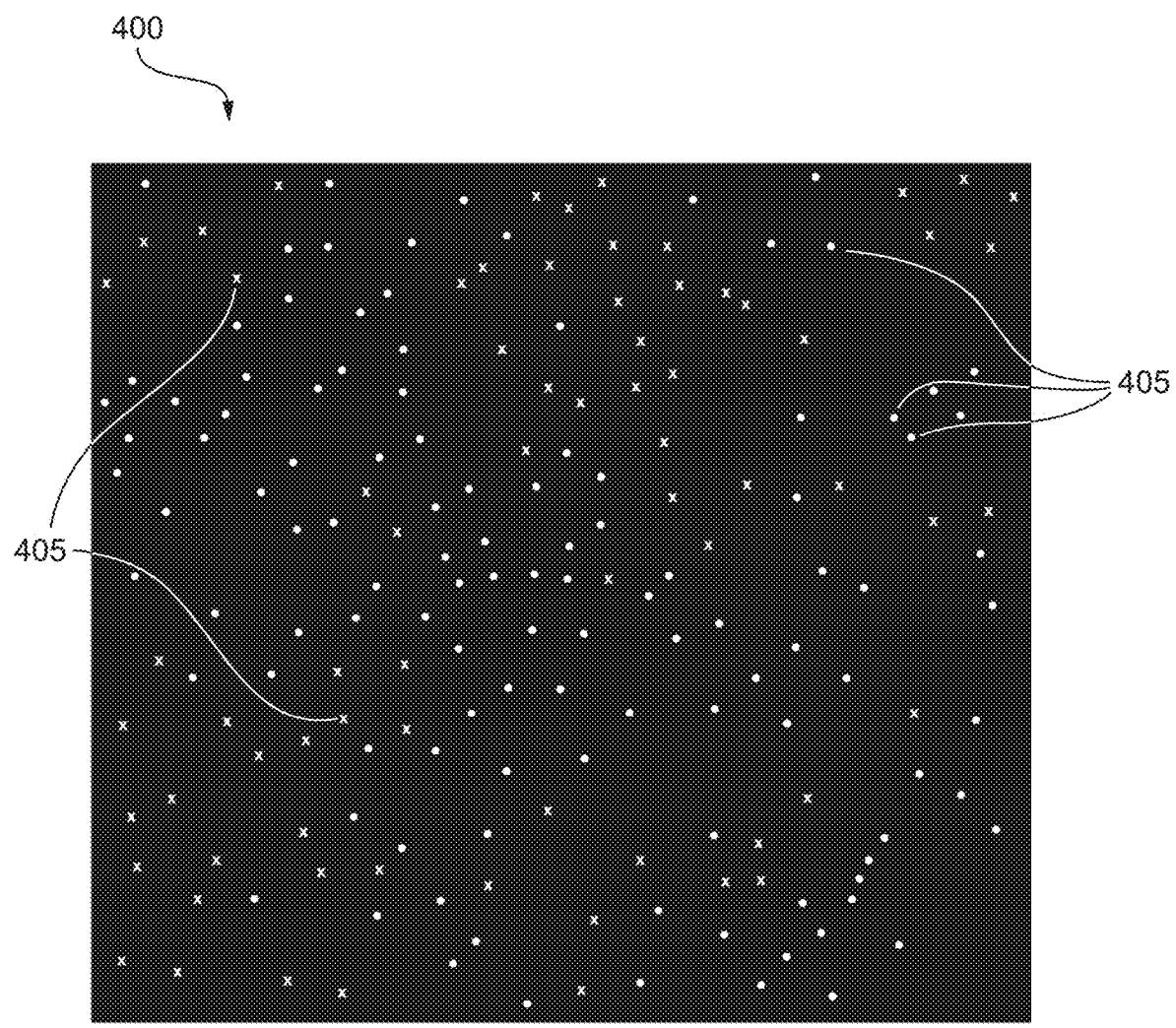
FIG. 4 shows annotated images with raw dot labels in accordance with various embodiments of the disclosure.

Process 300 starts at block 310, at which images for a biological sample are obtained or accessed by a computing device (e.g., the labeling controller 250 of computing environment 200 described with respect to FIG. 2). In some instances, the images depict cells having a staining pattern associated with a biomarker. In other instances, the images depict cells having multiple staining patterns associated with multiple biomarkers. The images are annotated with raw dot labels. The raw dot labels provide information including: (i) cell centers, and (ii) expression for the one or more biomarkers. As shown in FIG. 4, the images 400 include raw dot labels 405 placed at the center of each cell and a color, symbol, pattern, or the like of the raw dot labels 405 indicates expression for the one or more biomarkers. The "x" labels 405 indicate the cell is negative for the biomarker (not expressing the biomarker). The "+" labels 405 indicate the cell is positive for the biomarker (expressing the biomarker). As discussed with respect to FIG. 2, the raw dot labels 405 may be annotated by a user or automatically by an annotation tool in a pre-processing stage.

Figure 5:
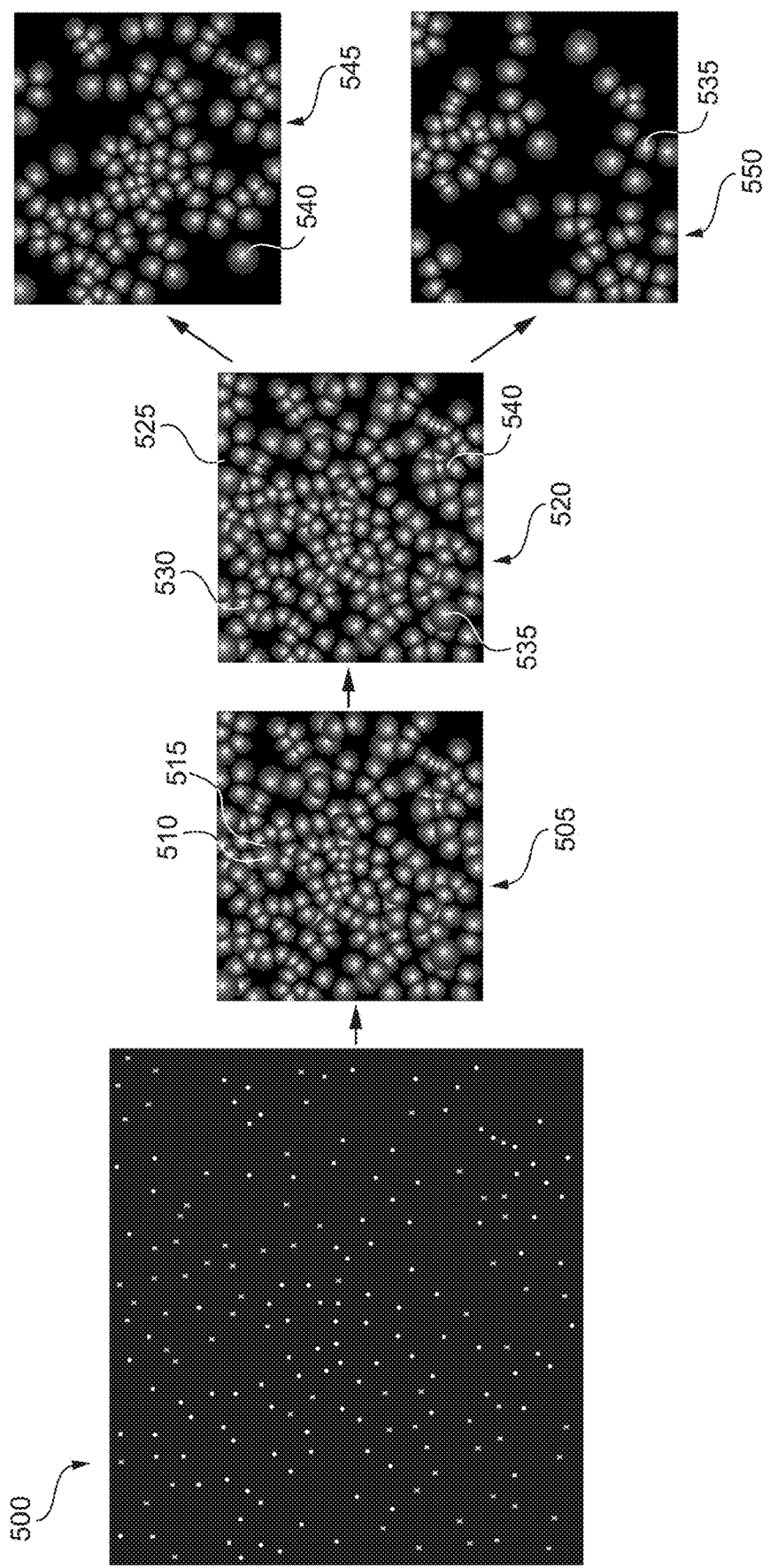
FIG. 5 shows an image being coded by the repel coding algorithm to provide an initial cell localization mask in accordance with various embodiments of the disclosure.

At block 320, the images are coded using a repel coding algorithm into an initial cell localization mask. The repel coding algorithm is defined in Equation (1). The repel coding algorithm calculates a distance between a pixel and its nearest cell center label and a distance between the pixel and its second nearest cell center label. For each pixel, a pseudo distance is calculated based on the distance between the pixel and its nearest cell center label and the distance between the pixel and its second nearest cell center label. If the pseudo distance is no less than a threshold value, the corresponding pixel is assigned a value of 0; otherwise a non-zero value will be assigned to the pixel according to the pseudo distance. FIG. 5 shows, an image 500 (e.g., image 400 described with respect to FIG. 4) being coded by the repel coding algorithm, which outputs an initial cell localization mask 505 comprising the cell centers 510 (represented by higher intensity pixels) and a perimeter 515 represented by response decay (lower intensity pixels) away from the cell centers 510.

At block 330, the initial cell localization mask is segmented based on biomarker staining patterns using the raw dot labels. The segmentation is performed using a segmentation algorithm. The segmenting is an instance segmentation where along with pixel level classification for localization, the segmentation algorithm further classifies each instance of a class separately (e.g., positive cells for PD1, negative cells for PD1, positive cells for HER2, negative cells for HER2, etc.). The segmenting algorithm may implement any known instance segmentation technique known in the art. For example, in some instances, the segmentation algorithm is ruled based and segments the cell localization mask based on the biomarker information provided by the raw dot labels. In other instances, the segmentation algorithm is cluster based such as k-means and segments the cell localization mask based on the biomarker information provided by the raw dot labels. FIG. 5 shows, the initial cell localization mask 505 segmented to generate a segmented cell localization mask 520 where each pixel belongs to a particular class (either background 525 or cell 530) based on the repel coding algorithm and a particular biomarker class (either negative for a biomarker 535 or positive for the biomarker 540) has been assigned to each pixel of the image based on the segmentation algorithm. It should be understood that the order of blocks 320 and 330 could be reversed where the segmentation algorithm is first applied to the image to generate a segmentation mask and thereafter the repel coding algorithm is applied to the segmentation mask to generate a segmented cell localization mask.

At block 340, the segmented cell localization mask is split into two or more repel coding masks. Essentially each class represented within the segmented cell localization mask is split out into its own separate repel coding mask. For example, if the segmented cell localization mask has two classes: (1) cells positive for a biomarker, and (2) cells negative for the biomarker; then the segmented cell localization mask is split into two repel masks: (1) one mask for cells positive for a biomarker, and (2) another mask for cells negative for the biomarker. The splitting may be performed using an image processing algorithm that hides or removes various classes selectable as parameters. For example continuing with the above example, the mask for cells positive for a biomarker may be generated by hiding or removing the cells negative for the biomarker from the segmented cell localization mask; whereas the mask for cells negative for a biomarker may be generated by hiding or removing the cells positive for the biomarker from the segmented cell localization mask. FIG. 5 shows, the segmented cell localization mask 520 split into two repel coding masks: (1) one mask 545 for cells positive for the biomarker, and (2) another mask 550 for cells negative for the biomarker.

V.B. Exemplary U-Net for Instance Segmentation

Figure 6:
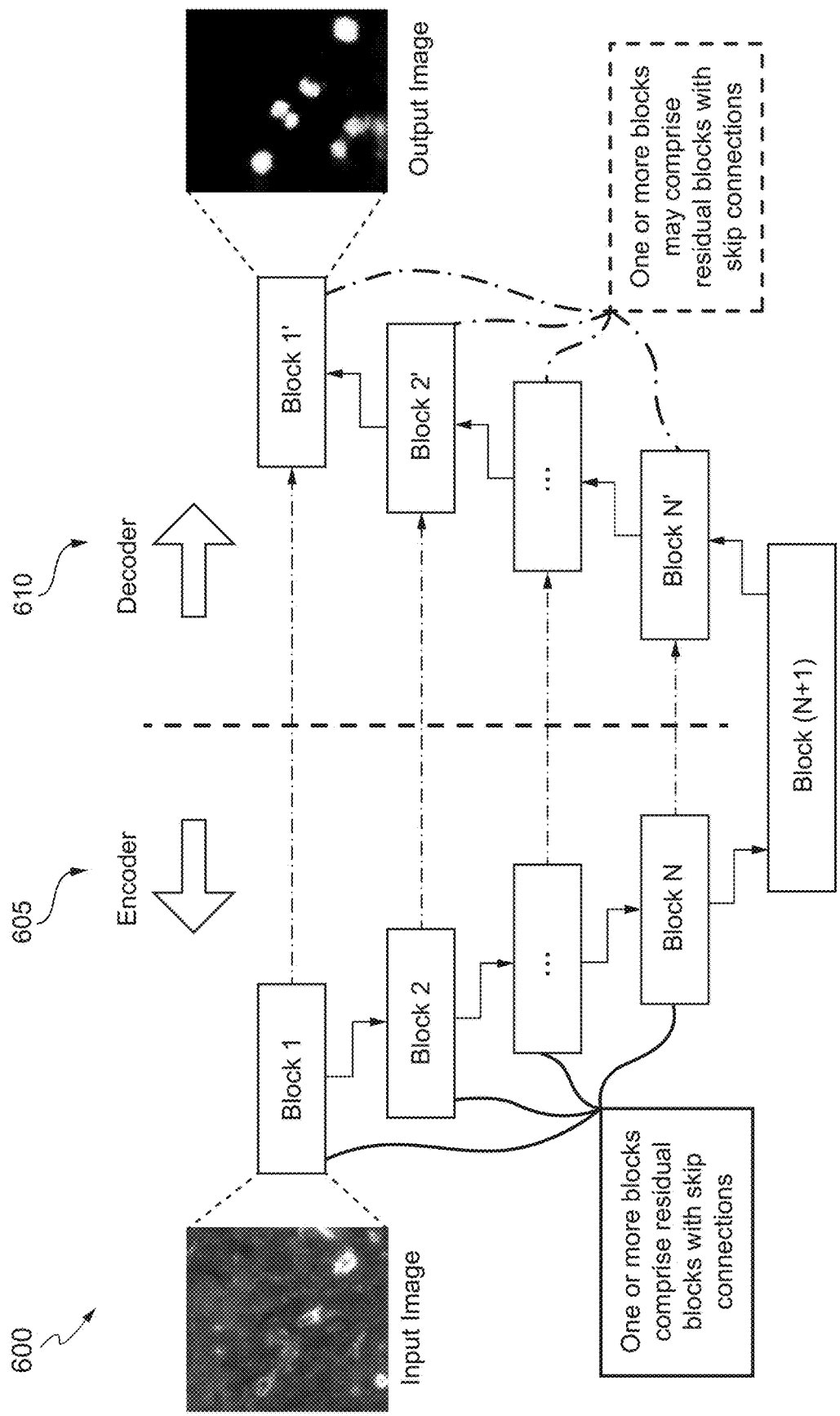
FIG. 6 shows a modified U-Net model to be used in biomarker segmentation in accordance with various embodiments of the disclosure.

A modified U-Net model can be used in biomarker segmentation methods to extract intricate features from input images (e.g., one or more images of the biological sample) individually and to generate two-dimensional segmentation masks with high resolution. As shown in FIG. 6, a modified U-Net model 600 may include an encoder 605 and a decoder 610, which gives it a u-shaped architecture. The encoder 605 is a CNN network that includes repeated application of convolutions (e.g., 3×3 convolutions (unpadded convolutions)) with one or more layers comprising residual blocks with skip connections, each followed by a rectified linear unit (ReLU) and a max pooling operation (e.g., a 2×2 max pooling with stride 2) for downsampling. One or more layers of the encoder 605 comprise residual blocks with skip connections. With the help of residual blocks, an original input of a convolution is also added to the output of the convolution. At each downsampling step or pooling operation, the number of feature channels may be doubled. During the encoding, the spatial information of the image data is reduced while feature information is increased. The decoder 610 is a CNN network that combines the feature and spatial information from the encoder 605 (upsampling of the feature map from the encoder 605). The upsampling of the feature map is followed by a sequence of up-convolutions (upsampling operators) that halves the number of channels, concatenations with a correspondingly cropped feature map from the encoder 605, repeated application of convolutions (e.g., two 3×3 convolutions) that are each followed by a rectified linear unit (ReLU), and a final convolution (e.g., one 1×1 convolution) to generate the two-dimensional segmentation masks. It should be appreciated that one or more layers of the decoder 610 may also comprise residual blocks with skip connections. In order to localize, the high-resolution features from the encoder 605 are combined with the upsampled output from the decoder 610.

Figure 7:
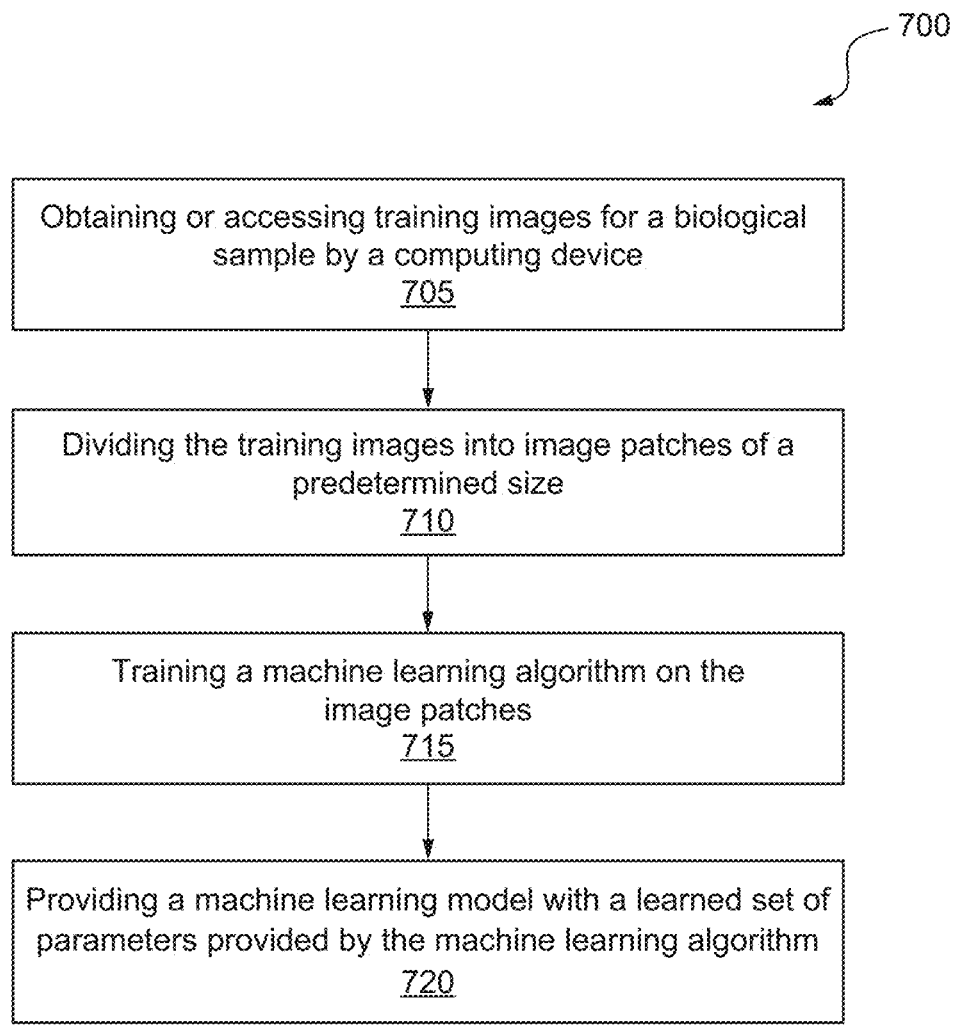
FIG. 7 shows a flowchart illustrating a process for training a machine learning algorithm to localize and classify cells based on biomarker expression patterns in accordance with various embodiments of the disclosure.

V.C. Techniques for Training a Machine Learning Algorithm for Instance Segmentation FIG. 7 shows a flowchart illustrating a process 700 for training a machine learning algorithm (e.g., a modified U-Net) to localize and classify cells based on biomarker expression patterns in accordance with various embodiments. The process 700 depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 700 presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 2, the processing depicted in FIG. 7 may be performed by as part of the training stage (e.g., algorithm training 220) to generate prediction or segmentation masks comprising a pixel level classification (e.g., background and cell) that localizes the cells and a biomarker expression classification per pixel for each instance of a class (e.g., a cell) that classifies the cells based on biomarker expression.

Process 700 starts at block 705, at which training images for a biological sample are obtained or accessed by a computing device, (e.g., pre-processed images 240 of computing environment 200 described with respect to FIG. 2). In some instances, the training images depict cells having a staining pattern associated with a biomarker. In other instances, the training images depict cells having multiple staining patterns associated with multiple biomarkers. The training images are annotated with repel coding masks (e.g., repel coding masks generated in accordance with process 300 described with respect to FIG. 3). The repel coding masks provide information concerning the training images, including: (i) cell locations, and (ii) classification of cells for the one or more biomarkers.

At block 710, the one or more images and mask labels are divided into image patches of a predetermined size. For example, images typically have random sizes and a machine learning algorithm such as a modified CNN learns better on a normalized image size, and thus the training images may be divided into image patches with a specific size to optimize training. In some embodiments, the training images are split into image patches having a predetermined size of 64 pixels×64 pixels, 128 pixels×128 pixels, 256 pixels×256 pixels, or 512 pixels×512 pixels. The divide of training images may be performed before repel coding masks are generated, thus the repel coding masks generated thereafter have the same size as that of the corresponding training image. Alternatively, the divide may be performed after repel coding masks are generated. In such instances, the repel coding masks are pre-processed and divided into mask patches of the same predetermined size as the training images before, after, or at the same time as the divide of the training images.

At block 715, a machine learning algorithm is trained on the image patches. In some instances, the machine learning algorithm is a modified U-Net comprising an encoder and a decoder, and one or more layers of the encoder comprise residual blocks with skip connections (or Resnet). The training may comprise performing iterative operations to find a set of parameters for the machine learning algorithm that minimizes or maximizes a cost function for the machine learning algorithm. The output from iteration is a prediction or segmentation mask comprising a pixel level classification (e.g., background and cell) that localizes the cells and a biomarker expression classification per pixel for each instance of a class (e.g., a cell) that classifies the cells based on biomarker expression. Each iteration involves finding the set of parameters for the machine learning algorithm so that a value of the cost function using the set of parameters is smaller or greater than a value of the cost function using another set of parameters in a previous iteration. The cost or objective function is constructed to measure a difference between: (i) the predicted pixel level classification and the predicted biomarker expression classification per pixel, and (ii) the ground truth repel coding masks. In certain instances, the cost function is a binary cross entropy loss function.

In some instances, the training further comprises adjusting a learning rate of the machine learning algorithm by maximizing or minimizing the learning rate according to a predefined schedule. The predefined schedule may be a step decay schedule that drops the learning rate by a predetermined factor every predetermined number of epochs for optimizing the cost function.

The training iterations continue until a stopping condition is satisfied. The training-completion condition may be configured to be satisfied when (for example) a predefined number of iterations have been completed, a statistic generated based on testing or validation exceeds a predetermined threshold (e.g., a classification accuracy threshold), a statistic generated based on confidence metrics (e.g., an average or median confidence metric or a percentage of confidence metrics that are above a particular value) exceeds a predefined confidence threshold, and/or a user device that had been engaged in training review closes a training application. As a result of the training, the machine learning algorithm has learned nonlinear relationships within the images that are used by the machine learning algorithm to predict a pixel level classification (e.g., background and cell) that localizes the cells and a biomarker expression classification per pixel for each instance of a class (e.g., a cell) that classifies the cells based on biomarker expression. Output of the training comprises a trained machine learning model with a learned set of parameters associated with the nonlinear relationships that derived the minimum value of the cost function or the maximum value of the cost function from all iterations.

At block 720, the trained machine learning model is provided. For example, the trained machine learning model may be deployed for execution in an image analysis environment, as described with respect to FIG. 2.

V.D. Techniques for Instance Segmentation Using a Machine Learning Model

Figure 8:
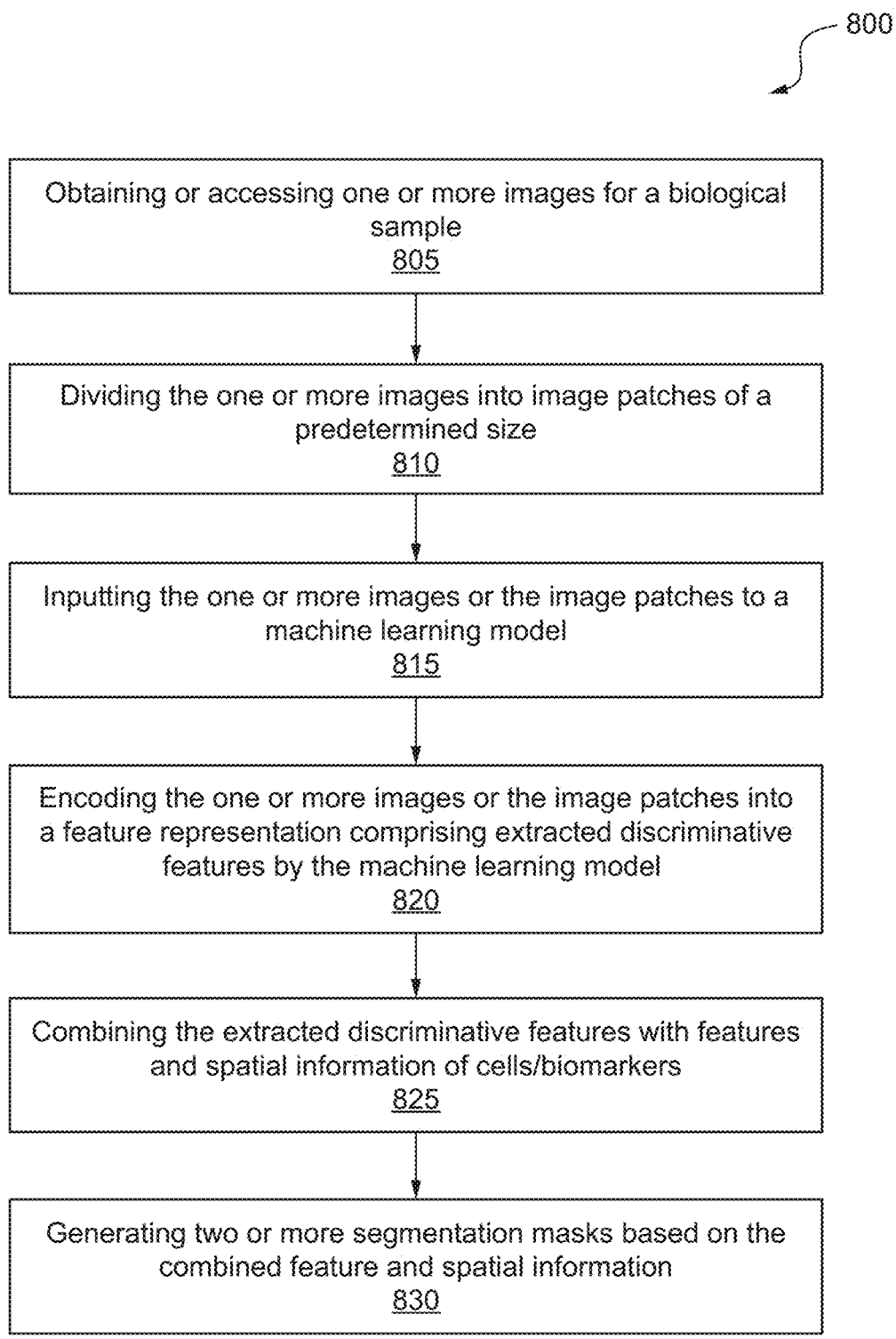
FIG. 8 shows a flowchart illustrating a process for using a machine learning model to localize and classify cells based on biomarker expression patterns in accordance with various embodiments of the disclosure.

FIG. 8 shows a flowchart illustrating a process 800 for using a machine learning model (e.g., a modified U-Net model) to localize and classify cells based on biomarker expression patterns in accordance with various embodiments. The process 800 depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 2, the processing depicted in FIG. 8 may be performed by as part of the result generation stage (e.g., result generation 280) to generate prediction or segmentation masks comprising a pixel level classification (e.g., background and cell) that localizes the cells and a biomarker expression classification per pixel for each instance of a class (e.g., a cell) that classifies the cells based on biomarker expression.

Process 800 starts at block 805, at which one or more images for a biological sample are accessed or obtained. The images depict cells comprising a staining pattern of one or more biomarkers. In certain instances, the one or more images depict cells comprising a staining pattern of a biomarker and another biomarker. As described with respect to FIG. 1, the image can be pre-processed by immunochemical staining techniques (e.g., IF) so that specific proteins and organelles in the biological sample are visible for an analysis system to process and analyze. In some embodiments, the image is stained using multiple stains or binders such as antibodies so that information about different biomarkers can be reported under multichannel analysis or similar techniques.

At block 810, the one or more images may be divided into image patches of a predetermined size. For example, images typically have random sizes and a machine learning algorithm such as a modified CNN learns better on a normalized image size, and thus the images may be divided into image patches with a specific size to optimize analysis. In some embodiments, the images are split into image patches having a predetermined size of 64 pixels×64 pixels, 128 pixels×128 pixels, 256 pixels×256 pixels, or 512 pixels×512 pixels.

At block 815, the one or more images or the image patches are input into a machine learning model for further analysis. In some instances, the machine learning model is a modified CNN (e.g., U-Net) model comprising an encoder and a decoder, and one or more layers of the encoder comprise residual blocks with skip connections (or Resnet). The machine learning model further comprises parameters learned from training images and corresponding label masks for each biomarker in the training images (as described in detail with respect to computing environment 200 and process 700). The label masks were generated using a repel coding scheme in combination with labels for each of the biomarkers (as described in detail with respect to computing environment 200 and process 300). As described with respect to FIG. 3, the generating the label masks comprises: (i) coding cells in each training image using the repel coding, the coding comprises cell centers and a perimeter represented by response decay away from the cell centers, and (ii) generating two or more label masks for each of the biomarkers in the image based on the coding and the labels for each of the biomarkers.

At block 820, the one or more images or the image patches are encoded into a feature representation comprising extracted discriminative features by the machine learning model provided. The discriminative features (e.g., lower resolution features) may be associated with a biological material or structure such as cells. The machine learning model may perform the encoding of the images or image patches into the discriminate features at multiple different levels within multiple different subnetworks, and each subnetwork associates with at least one expression (e.g., positive or negative) of biomarker(s).

At block 825, the extracted discriminative features are combined with feature and spatial information of the cells and the staining patterns of biomarkers in the images or image patches through a sequence of up-convolutions and concatenations. The combining may be performed by projecting the extracted discriminative features onto a pixel space (e.g., a higher resolution), and classifying each pixel space. The decoder of by the machine learning model may perform the combination and the projecting of the extracted discriminative features at multiple different levels within multiple different subnetworks. In certain instances, the multiple different levels perform upsampling (i.e., expand the feature dimensions to the original size of the input image patches) and concatenation followed by regular convolution operations to project the extracted discriminative features. The classifying comprises cell detection and classification of the cell based on the staining pattern of the biomarker. Specifically, the classifying comprises a pixel level classification (e.g., background and cell) that localizes the cells and a biomarker expression classification per pixel for each instance of a class (e.g., a cell) that classifies the cells based on biomarker expression.

At block 830, two or more segmentation masks for each of the one or more biomarkers are generated and output based on the combined feature and spatial information of the cells and the staining pattern of the biomarker. The two or more segmentation masks comprise a positive segmentation mask for cells expressing the biomarker and a negative segmentation mask for cells not expressing the biomarker. In some instances, the segmentation masks are output as a high resolution image patch in which each pixel on each mask is assigned a value representing that probability of the location of a cell and a type of biomarker being expressed (or reaches certain expression criteria). In some embodiments, the segmentation masks are output at a size of 256 pixels×256 pixels with each pixel having a value in range from 0 to 1, where 0 represents the biomarker corresponding to the segmentation mask is not expressed (or does not reach the expression criteria) at the pixel location and 1 represents the biomarker corresponding to the segmentation mask is expressed (or reaches the expression criteria) at the pixel location.

At optional block 835, the two or more segmentation masks may be overlaid on the one or more images or the image patches to generate instance segmented images. In some instances, an overlay algorithm may comprise selecting the maximum pixel value of each pixel on the segmentation masks and assigning the maximum value to the corresponding pixel on the instance segmented image. In some instances, an overlay algorithm may comprise assigning weights to pixels on each segmentation mask, combining the weighted pixel values for each pixel, and assigning the combined value to the corresponding pixel on the instance segmented image. The overlay algorithm may further comprise a checking step to make sure each pixel value is no greater than 1. It should be appreciated that an overlay algorithm is not limited to the mentioned algorithms and can be any algorithm known to a person with ordinary skills in the art.

At block 840, the two or more segmentation masks and/or the instance segmented images are output. For example, the two or more segmentation masks and/or the instance segmented images may be locally presented or transmitted to another device. The two or more segmentation masks and/or the instance segmented images may be output along with an identifier of the subject. In some instances, the two or more segmentation masks and/or the instance segmented images are output to an end user or storage device.

At optional block 845, a diagnosis of a subject associated with the biological sample determined using the two or more segmentation masks and/or the instance segmented images. In some instances, the diagnosis is determined based on the cells expressing the biomarker within the instance segmented image. In some instances, the diagnosis is determined based on the cells not expressing the biomarker within the instance segmented image. In some instances, the diagnosis is determined based on a combination of the cells expressing the biomarker within the instance segmented image and the cells not expressing the biomarker within the instance segmented image.

At optional block 850, a treatment is administered to the subject associated with the biological sample. In some instances, the treatment is administered based on the cells expressing the biomarker within the instance segmented image. In some instances, the treatment is administered based on the cells not expressing the biomarker within the instance segmented image. In some instances, the treatment is administered based on the diagnosis of the subject determined at block 845. In some instances, the treatment is administered based on any combination of the cells expressing the biomarker within the instance segmented image, the cells not expressing the biomarker within the instance segmented image, and the diagnosis of the subject determined at block 845.

V.E. Techniques for Using Instance Segmentation in Image Analysis

Figure 9:
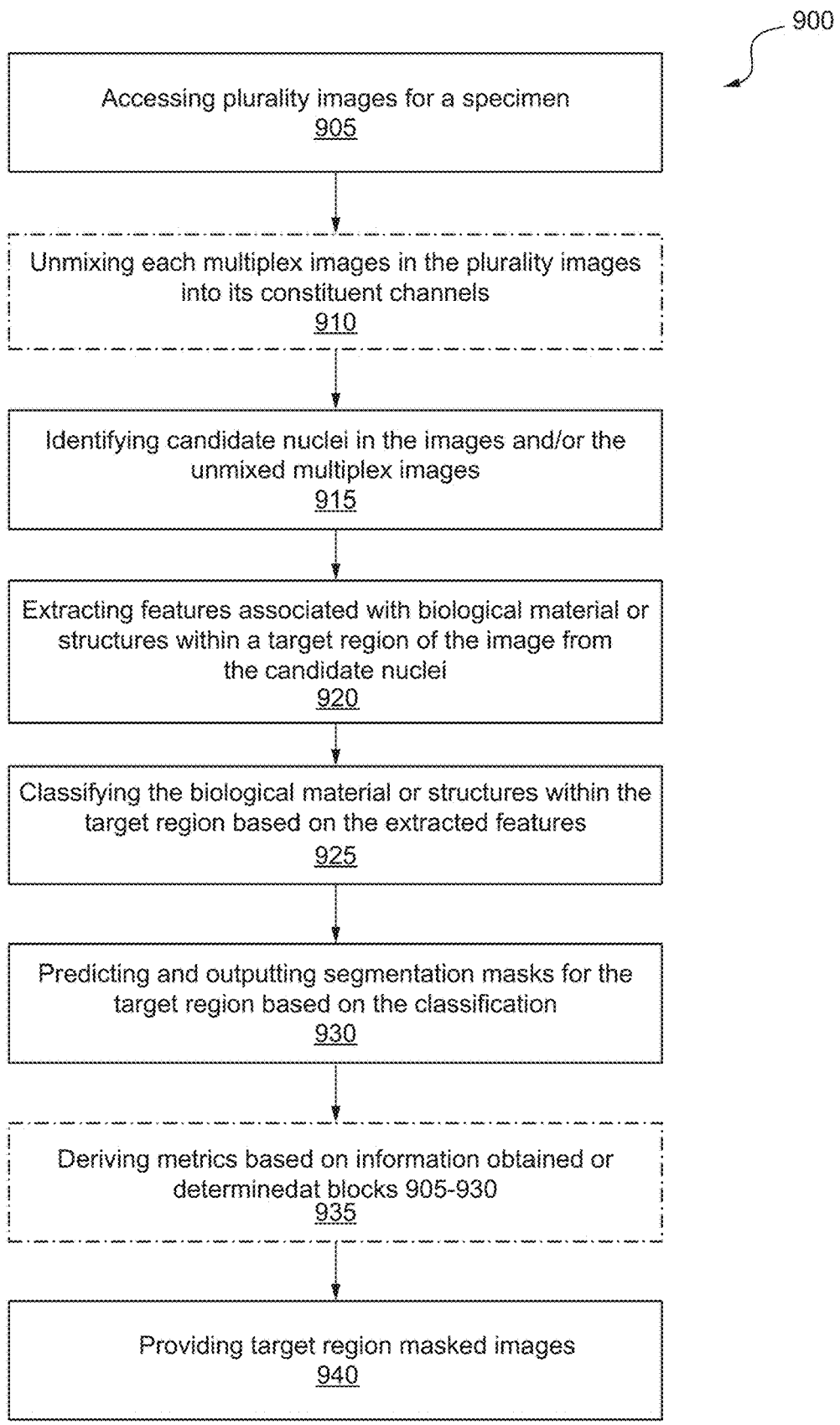
FIG. 9 shows a flowchart illustrating a process for applying a segmentation mask to support or improve image analysis in accordance with various embodiments of the disclosure.

FIG. 9 shows a flowchart illustrating a process 900 for applying a segmentation mask to support or improve image analysis in accordance with various embodiments. The process 900 depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 900 presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 2, the processing depicted in FIG. 9 may be performed by as part of the result generation stage (e.g., result generation 225) to support or improve image analysis.

Process 900 starts at block 905, at which plurality images for a specimen are accessed. In some instances, the specimen is stained for one or more biomarkers. In some embodiments, the images accessed are RGB images or multispectral images. In some embodiments, the images accessed are stored in a memory device. The images may be generated or obtained using an imaging device (e.g., the imaging device described with respect to FIG. 1), such as in real-time. In some embodiments, the images are accessed from a microscope or other instrument capable of capturing image data of a specimen-bearing microscope slide, as described herein. In some embodiments, the images are accessed from a 2D scanner, such as one capable of scanning image tiles. Alternatively, the images may be images that have been previously generated (e.g. scanned) and stored in a memory device (or, for that matter, retrieved from a server via a communication network). In some instances, the images are instance segmented images that include one or more segmentation masks for biological material or structures such as cells. The instance segmented image may be generated and/or obtained for access, as described with respect to process 800 and FIG. 8.

In some embodiments, the images accessed are multiplex images, i.e., the image received is of a biological sample stained with more than one stain. In these embodiments at block 910, and prior to further processing, each multiplex image is unmixed into its constituent channels, where each unmixed channel corresponds to a particular stain or signal. Following image acquisition and/or unmixing, the images or unmixed image channel images are processed with an image analysis algorithm in blocks 915-945 to identify and classify cells and/or nuclei. The processes and analysis algorithm described herein may be adapted to identify and classify various types of cells or cell nuclei based on features within the input images, including identifying and classifying tumor cells, non-tumor cells, stroma cells, lymphocytes, non-target stain, etc.

At block 915, candidate nuclei are identified. In some embodiments, the images are input into image analysis to detect nucleus centers (seeds) and/or to segment the nuclei. For example, a plurality of pixels in the images stained with a biomarker may be identified, including considering a one or more color planes of a plurality of pixels in a foreground of the input image for simultaneous identification of cell cytoplasm and cell membrane pixels. In some instances, the images are pre-processed to remove portions of the images that are not to be analyzed or are not determined to be background or negative for a given biomarker, for example, the slide background, the cells that are not expressing a given biomarker, as described with respect to FIGS. 2-8), and/or counterstained components of the images. Thereafter, a threshold level between cell cytoplasm and cell membrane pixels in the foreground of the digital image is determined, and a selected pixel and its predetermined number of pixel neighbors from the foreground are processed to determine whether the selected pixel is cell cytoplasm pixel, a cell membrane pixel or a transitional pixel in the digital image based on the determined threshold level. In some embodiments, tumor nuclei are automatically identified by applying a radial-symmetry-base method, a radial-symmetry-based method of Parvin such as on the Hematoxylin image channel or a biomarker image channel after the unmixing.

At block 920, features are extracted from the candidate nuclei. At least some of the features may be associated with biological material or structures within a target region of the image such as a tumor cell or cluster of tumor cells. The extraction may be performed by an image analysis prediction model such as a Mask R-CNN capable of semantic or instance segmentation. For example, after candidate nuclei are identified, the candidate nuclei may be further analyzed by the image analysis prediction model to distinguish tumor nuclei from other candidate nuclei (e.g., lymphocyte nuclei). In certain instances, the other candidate nuclei may be further processes to identify specific classes of nuclei and/or cells, e.g., identify lymphocyte nuclei and stroma nuclei.

At block 925, the biological material or structures within the target region are classified as a type of cell or cell nuclei based on the features extracted from the candidate nuclei. The classification may be performed by the image analysis prediction model. In some embodiments, a learnt supervised classifier is applied to identify tumor nuclei from the candidate nuclei. For example, the learnt supervised classifier may be trained on nuclei features to identify tumor nuclei and then applied to classify the nucleus candidate in the test image as either a tumor nucleus or a non-tumor nucleus. Optionally, the learnt supervised classifier may be further trained to distinguish between different classes of non-tumor nuclei, such as lymphocyte nuclei and stromal nuclei. In some embodiments, the learnt supervised classifier used to identify tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features. The trained random forest classifier may then be applied to classify the nuclei in a test image into tumor nuclei and non-tumor nuclei. Optionally, the random forest classifier may be further trained to distinguish between different classes of non-tumor nuclei, such as lymphocyte nuclei and stromal nuclei.

At block 930, segmentation masks for the target region are predicted and output based on the classification of the biological material or structures. The segmentation masks may be output by the image analysis prediction model. The segmentation masks may be overlaid on the images to generate target region masked images.

At optional block 935, metrics may be derived from various identified nuclei, cells, clusters of cells, and/or biological material or structures, as discussed in detail herein. In some instances, one or more metrics may be computed by applying various image analysis algorithms on pixels contained in or surrounding classified nuclei, cells, clusters of cells, and/or biological material or structures. In some embodiments, the metric includes disease state, area, minor, and major axis lengths, perimeter, radius, solidity, etc.

At block 940, the target region masked images are provided. For example, target region masked images or the target region may be provided to a memory storage device, provided to a display of a computing device, provided to a user in one or more type of medium such as user interface, etc. In some instances, the providing of the target region masked images includes providing the associated metrics or the metric may be provided separately.

VI. Examples

Example 1. An Experiment Using PD1

Figure 10:
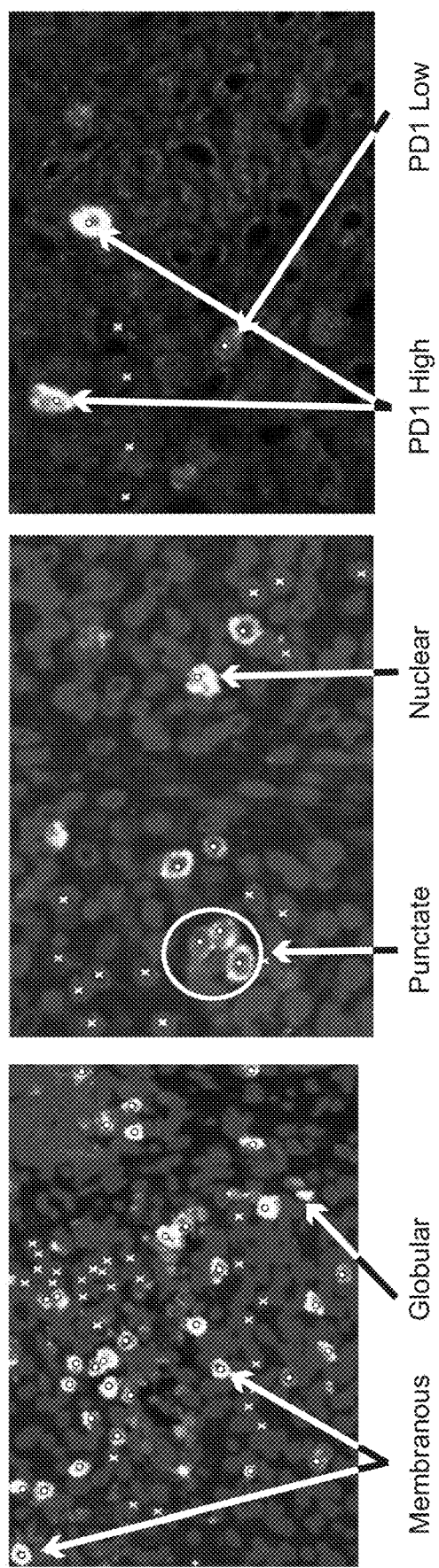
FIG. 10 shows different patterns of PD1 in accordance with various embodiments of the disclosure.

Images from ImageNet dataset were used to train a machine learning model. The ImageNet dataset included multiple IF stained tissue slides which include Gastric, Pancreas, Lung, Breast, Colon, and Bladder as indications. The dataset included variable size images covering tumor, pen-tumor, and normal tissue regions in the slides. The images had a resolution of 0.325 μm/pixel. The images were preprocessed using repel coding as described herein with respect to Equation (1). Patches were extracted from these images and masks to train the model. In the present example, training image patches had a size of 250 pixels×250 pixels. The biomarker used for classification was PD1. This biomarker is primarily expressed on lymphocytes and manifested in numerous patterns including membranous (partial or complete), punctate, nuclear, globular and also combination of these patterns. PD1 exhibits patterns that express at a broad range of intensities. FIG. 10 shows different staining patterns of PD1.

Figure 11:
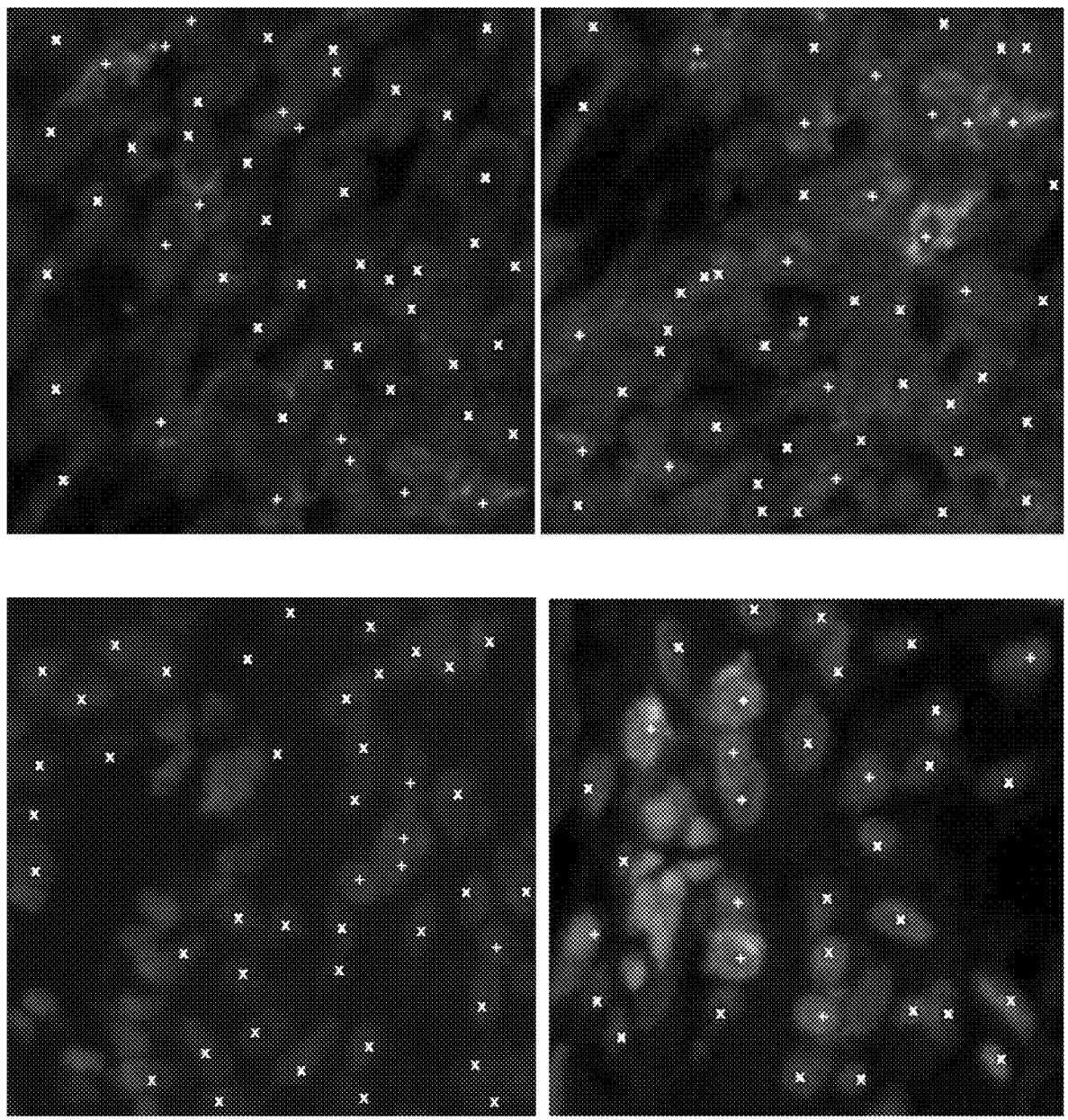
FIG. 11 shows visual results from both the training set and validation set in Example 1.

In the present experiment 100 images were chosen from 15 different slides. The images were split into patches with size of 250 pixels×250 pixels before feeding to a machine learning model, as described with respect FIG. 6. FIG. 11 shows visual results from both the training set and validation set. The model did not detect any false positives on the expression of red blood cells. Table 1 demonstrates the recall and precision of PD1+ and PD1− cells for both the training and the validation sets.

TABLE 1

Recall and Precision on Training and Validation Sets

|  | Recall (%) | Precision (%) |
| --- | --- | --- |
| PD1+ (Training Set) | 94.37 | 98.74 |
| PD1− (Training Set) | 98.12 | 98.5 |
| PD1+ (Validation Set) | 87.45 | 90.12 |
| PD1− (Validation Set) | 86.5 | 88.37 |

VII. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
   accessing an image for a biological sample, wherein the image depicts cells comprising a staining pattern of a biomarker;
   inputting the image into a machine learning model, wherein:
   the machine learning model comprises a convolutional neural network including an encoder and a decoder,
   one or more layers of the encoder comprise residual blocks with skip connections,
   parameters of the machine learning model were learned from training images and label masks for each biomarker in the training images, and
   the label masks were generated using a repel coding in combination with labels for each of the biomarkers;
   encoding, by the machine learning model, the image into a feature representation comprising extracted discriminative features;
   combining, by the machine learning model, feature and spatial information of the cells and the staining pattern of the biomarker through a sequence of up-convolutions and concatenations with the extracted discriminative features from the feature representation; and generating, by the machine learning model, two or more segmentation masks for the biomarker in the image based on the combined feature and spatial information of the cells and the staining pattern of the biomarker, wherein the two or more segmentation masks comprise a positive segmentation mask for cells expressing the biomarker and a negative segmentation mask for cells not expressing the biomarker.

2. The computer-implemented method of claim 1, further comprising:
overlaying the two or more segmentation masks on the image to generate an instance segmented image; and
outputting the instance segmented image.

3. The computer-implemented method of claim 2, further comprising:
determining, by a user, a diagnosis of a subject associated with the biological sample, wherein the diagnosis is determined based on (i) the cells expressing the biomarker within the instance segmented image, and/or (ii) the cells not expressing the biomarker within the instance segmented image.

4. The computer-implemented method of claim 3, further comprising:
administering, by the user, a treatment to the subject based on (i) the cells expressing the biomarker within the instance segmented image, (ii) the cells not expressing the biomarker within the instance segmented image, and/or (iii) the diagnosis of the subject.

5. The computer-implemented method of claim 4, wherein:
the image depicts cells comprising a staining pattern of a biomarker and another biomarker,
the machine learning model generates two or more segmentation masks for the another biomarker in the image, and
the two or more segmentation masks for the another biomarker comprise a positive segmentation mask for cells expressing the another biomarker and a negative segmentation mask for cells not expressing the another biomarker.

6. The computer-implemented method of claim 5, further comprising:
overlaying the two or more segmentation masks for each of the biomarker and the another biomarker on the image to generate an instance segmented image; and
outputting the instance segmented image.

7. The computer-implemented method of claim 1, wherein the generating the label masks comprises: (i) coding cells in each training image using the repel coding, the coding comprises cell centers and a perimeter represented by response decay away from the cell centers, and (ii) generating two or more label masks for each of the biomarkers in the image based on the coding and the labels for each of the biomarkers.

8. The computer-implemented method of claim 1, wherein the combining the feature and spatial information of the cells and the staining pattern of the biomarker, comprises: projecting the extracted discriminative features onto a pixel space, and classifying each pixel space, wherein the classifying comprises cell detection and classification of the cell based on the staining pattern of the biomarker.

9. A system comprising:
one or more data processors; and
a non-transitory computer readable storage medium containing instructions which, when executed on the one or more data processors, cause the one or more data processors to perform the following operations:
accessing an image for a biological sample, wherein the image depicts cells comprising a staining pattern of a biomarker;
inputting the image into a machine learning model, wherein:
the machine learning model comprises a convolutional neural network including an encoder and a decoder,
one or more layers of the encoder comprise residual blocks with skip connections,
parameters of the machine learning model were learned from training images and label masks for each biomarker in the training images, and
the label masks were generated using a repel coding in combination with labels for each of the biomarkers;
encoding, by the machine learning model, the image into a feature representation comprising extracted discriminative features;
combining, by the machine learning model, feature and spatial information of the cells and the staining pattern of the biomarker through a sequence of up-convolutions and concatenations with the extracted discriminative features from the feature representation; and
generating, by the machine learning model, two or more segmentation masks for the biomarker in the image based on the combined feature and spatial information of the cells and the staining pattern of the biomarker, wherein the two or more segmentation masks comprise a positive segmentation mask for cells expressing the biomarker and a negative segmentation mask for cells not expressing the biomarker.

10. The system of claim 9, wherein the operations further comprise:
overlaying the two or more segmentation masks on the image to generate an instance segmented image; and
outputting the instance segmented image.

11. The system of claim 9, wherein:
the image depicts cells comprising a staining pattern of a biomarker and another biomarker,
the machine learning model generates two or more segmentation masks for the another biomarker in the image, and
the two or more segmentation masks for the another biomarker comprise a positive segmentation mask for cells expressing the another biomarker and a negative segmentation mask for cells not expressing the another biomarker.

12. The system of claim 11, wherein the operations further comprise:
overlaying the two or more segmentation masks for each of the biomarker and the another biomarker on the image to generate an instance segmented image; and
outputting the instance segmented image.

13. The system of claim 9, wherein the generating the label masks comprises: (i) coding cells in each training image using the repel coding, the coding comprises cell centers and a perimeter represented by response decay away from the cell centers, and (ii) generating two or more label masks for each of the biomarkers in the image based on the coding and the labels for each of the biomarkers.

14. The system of claim 9, wherein the combining the feature and spatial information of the cells and the staining pattern of the biomarker, comprises: projecting the extracted discriminative features onto a pixel space, and classifying each pixel space, wherein the classifying comprises cell detection and classification of the cell based on the staining pattern of the biomarker.

* * * * *